United States Patent [19]

Boll et al.

[11] Patent Number: 4,897,878

[45] Date of Patent: Jan. 30, 1990

[54] NOISE COMPENSATION IN SPEECH RECOGNITION APPARATUS

[75] Inventors: Steven F. Boll; Jack E. Porter, both of San Diego, Calif.

[73] Assignee: ITT Corporation, New York, N.Y.

[21] Appl. No.: 769,215

[22] Filed: Aug. 26, 1985

[51] Int. Cl.$^4$ .............................................. G10L 7/08
[52] U.S. Cl. ....................................... 381/43; 381/47
[58] Field of Search .................................. 381/41–50; 364/513.5

[56] References Cited

U.S. PATENT DOCUMENTS

| 4,499,594 | 2/1985 | Lewinter | 381/46 |
| 4,567,606 | 1/1986 | Vensko et al. | 381/43 |
| 4,624,008 | 11/1986 | Vensko et al. | 381/43 |

FOREIGN PATENT DOCUMENTS 0216118  4/1987  European Pat. Off. .............. 381/46

OTHER PUBLICATIONS

Boll, Suppression of Acoustic Noise in Speech Using Spectral Subtraction, IEEE Trans. on ASSP, vol. ASSP-27, No. 3, Apr. 1979, pp. 113–120.
Tierney, A Study of LPC Analysis of Speech in Additive Noise, IEEE Trans. on ASSP, vol. ASSP-28, No. 4, Aug. 1980, pp. 389–397.
F. Itakura, Minimum Protection Residual Principle Applied Speech Recognition, IEEE Trans. on ASSP, vol. ASSP-23, pp. 67–72, Feb. 1975.
Porter and Boll, "Optimal Estimators for Spectral Restoration of Noisy Speech", ICASSP, San Diego, CA, Mar. 1984, pp. 18A.2.1–18A.2.4.

Primary Examiner—David L. Clark
Assistant Examiner—David D. Knepper
Attorney, Agent, or Firm—Thomas N. Twomey; Mary C. Werner

[57] ABSTRACT

A method and apparatus for noise suppression for speech recognition systems which employs the principle of a least means square estimation which is implemented with conditional expected values. Essentially, according to this method, one computes a series of optimal estimators which estimators and their variances are then employed to implement a noise immune metric. This noise immune metric enables the system to substitute a noisy distance with an expected value which value is calculated according to combined speech and noise data which occurs in the bandpass filter domain. Thus the system can be used with any set of speech parameters and is relatively independent of a specific speech recognition apparatus structure.

8 Claims, 9 Drawing Sheets

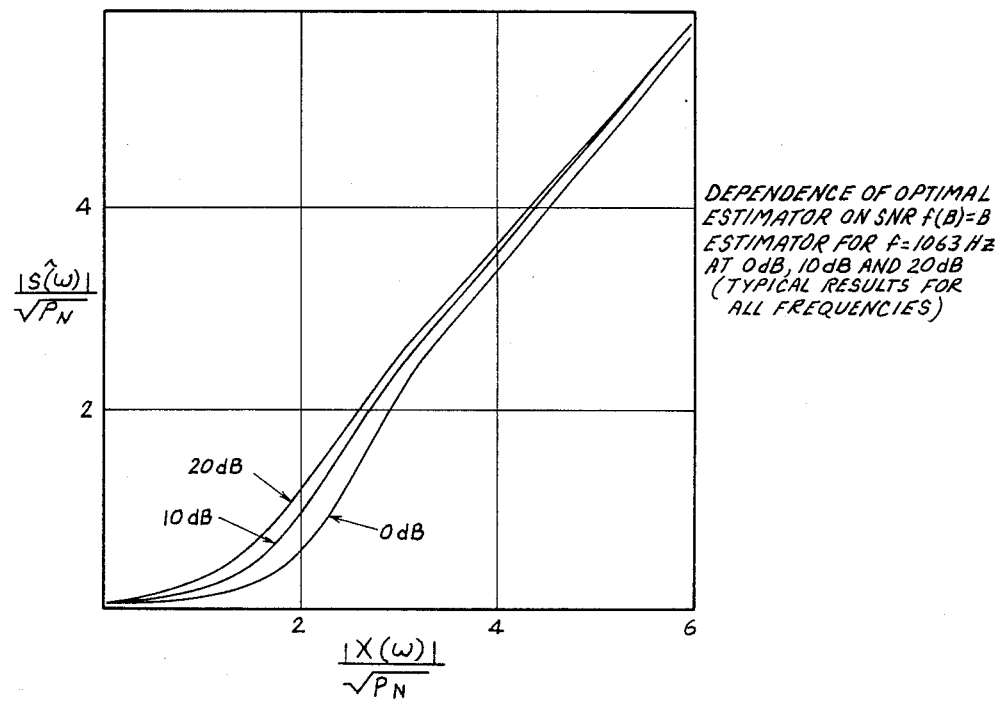
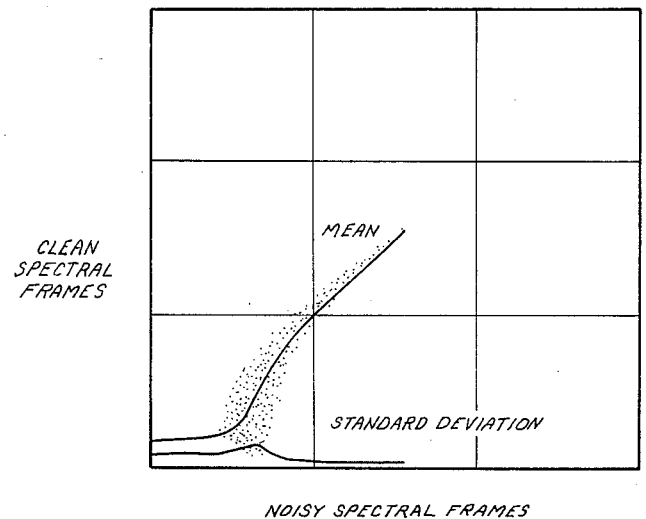

MEAN AND STANDARD DEVIATION PLOTTED AGAINST NOISY VERSUS CLEAN SPEECH AND SILENCE FRAMES

PREDICTED AND OBSERVED PEUM FOR NOISE-ONLY CASE, CHANNEL EQUIVALENT EQUALS 1.81

PREDICTED AND OBSERVED PEUM FOR NOISY SPEECH FRACTILES EQUAL .05, .10, .20, .50, .70, .90, .95
X AXIS = CLEAN SPEECH,
Y AXIS = NOISY SPEECH
CHANNEL EQUIVALENT EQUALS 8.1

CLEAN DISTANCE AND ALTERNATIVE METRICS VERSUS NOISY UNKNOWN PARAMETERS FOR TEMPLATE FRAME 0

CLEAN DISTANCE AND ALTERNATIVE METRICS VERSUS NOISY UNKNOWN PARAMETERS FOR TEMPLATE FRAME 10

CLEAN DISTANCE AND ALTERNATIVE METRICS VERSUS NOISY UNKNOWN PARAMETERS FOR TEMPLATE FRAME 50

WORDSPOTTING PERFORMANCE USING UNNORMALIZED PARAMETERS, SPEAKER 50

WORDSPOTTING PERFORMANCE USING UNNORMALIZED PARAMETERS, SPEAKER 51

WORDSPOTTING PERFORMANCE USING UNNORMALIZED PARAMETERS, SPEAKER JOCO

WORDSPOTTING PERFORMANCE USING UNNORMALIZED PARAMETERS, SPEAKER GARA

WORDSPOTTING PERFORMANCE USING UNNORMALIZED PARAMETERS, SPEAKER CHWA

WORDSPOTTING PERFORMANCE USING UNNORMALIZED PARAMETERS, SPEAKER CAOL

NOISE COMPENSATION IN SPEECH RECOGNITION APPARATUS

The invention was made with Government support under Contract No. MDA-904-83-C-0475 awarded by the National Security Agency. The Government has certain rights in this invention.

BACKGROUND OF THE INVENTION

This invention relates to speech recognition systems and more particularly to a noise compensation method employed in speech recognition systems.

Speech recognizers measure the similiarity between segments of unknown and template speech by computing the Euclidean distance between the respective segment parameters. The Euclidean distance, as is known, is the sum of the squares between such parameters. In such systems, by adding noise to either the unknown or template speech or both causes the distance to become either too large or too small and hence produce undesirable results in regard to the speech recognizing capability of the system.

As is known, speech may be represented as a sequence of frequency spectra having different power levels across the frequency spectrum associated with speech. In order to recognize speech, spectra from unknown words are compared with known spectra. The storage of the known spectra occurs in the form of templates or references. Basically, in such systems, unknown speech is processed into, for example, digital signals, and these signals are compared with stored templates indicative of different words.

By comparing the unknown speech with the stored templates, one can recognize the unknown speech and thereby assign a word to the unknown speech. Speech recognition systems are being widely investigated and eventually will enable a user to communicate with a computer or other electronic device by means of speech. A larger problem in regard to speech recognition systems in general is dealing with interfering noise such as background noise as well as the sounds made by a speaker which sounds are not indicative of true words such as lip smacking, tongue clicks, and so on. Other sources of interferences such as background noise as well as other environmental noises produce interfering spectra which prevent the recognition system from operating reliably.

In order to provide recognition with a noise background, the prior art has attempted to implement various techniques. One technique is referred to as noise masking. In this technique, one masks those parts of the spectrum which are due to noise and leaves other parts of the spectrum unchanged. In these systems both the input and template spectra are masked with respect to a spectrum made up of maximum values of an input noise spectrum estimate and a template noise spectrum estimate. In this way, the spectral distance between input and template may be calculated as though the input and template speech signals were obtained in the same noise background. Such techniques have many disadvantages. For example, the presence of high noise level in one spectrum can be cross coupled to mask speech signals in the other spectrum.

These systems require extensive mathematical computation and are therefore extremely expensive, while relatively unreliable. In other techniques proposed in the prior art, one measures the instantaneous signal-to-noise ratio and replaces the noisy distance with a predetermined constant. This substitution has the effect of ignoring information in those frequency intervals where the signal-to-noise ratio is poor. In any event, this creates other problems in that the speech recognition system may ignore unknown speech segments in confusing them as noise or may serve to match a template to a dissimilar unknown speech segment. Hence the above noted approach produces many errors which are undesirable.

It is, therefore, an object of the present invention to provide an improved speech recognition system whereby the noisy distance is replaced with its expected value.

It is a further object to provide a speech recognition system which will reduce the above noted problems associated with prior art systems.

As will be explained, the system according to this invention replaces the noisy distance with its expected value. In this manner incorrect low scores are increased and incorrect high scores are decreased. The procedures according to this invention require no operator intervention nor empirically determined thresholds. The system can be used with any set of speech parameters and is relatively independent of a specific speech recognition apparatus structure.

BRIEF DESCRIPTION OF THE PREFERRED EMBODIMENT

A method of reducing noise in a speech recognition apparatus by using the minimum mean square error estimate of the actual squared Euclidean distance between template speech and unknown speech signals as conditioned by noisy observations, comprising the steps of providing a first value indicative of the value of a noise-free template, $t_s$, providing a second value $U_s$ indicative of the noise free unknown, providing a third value indicative of a noisy template $t_{s+n}$, providing a fourth value indicative of a noisy unknown speech signal $U_{s+n}$, providing a fifth value indicative of the average power of said unknown speech signals, $P_s$, providing a sixth value indicative of the average power of noise signals $P_n$, computing a new expected distance between said template speech to said unknown speech signals according to the following algorithm:

$$d^2 = E[(t_s - u_s)^2 / t_{s+n}, u_{s+n}, p_s, p_n].$$

using said new expected distance as computed to measure the similarity between said template speech and said unknown speech.

BRIEF DESCRIPTION OF THE FIGURES

Before proceeding with a brief description of the figures, it is noted that there are seven Appendices which form part of this application, and the Figures below are referred to in the Appendices as well as in the specification.

FIG. 4 is a graph showing the dependence of optimal estimators on signal-to-noise ratio.

FIG. 5 is a graph depicting a mean and standard deviation plotted against noisy versus clean fourth rooted spectral frames.

DETAILED DESCRIPTION OF THE DRAWINGS

Figure 1:
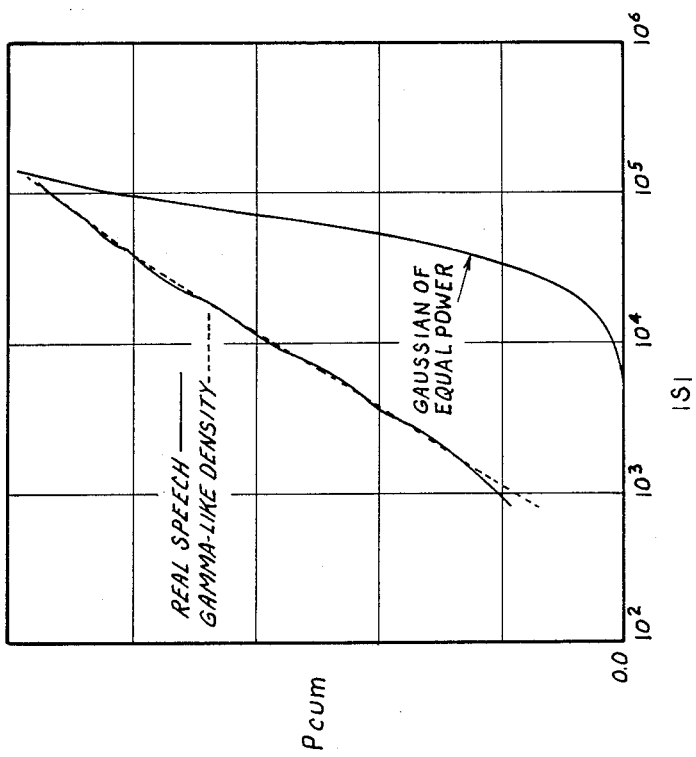
FIG. 1 is a graph depicting the distribution of real speech spectral magnitude and of a Gaussian distribution.

As will be explained, this invention describes a method of noise suppression for speech recognition systems which method employs the principle of least mean squares estimation implemented with conditional expected values. The method can be applied to both restoration of noisy spectra and the implementation of noise immune metrics.

The method has been employed for the types of recognition systems which are the connected digit recognition system and wordspotting. Utilizing the method in regard to both systems resulted in improvements in operation.

Before describing the method, a few comments concerning the problems in general will be described. As indicated, additive noise degrades the performance of digital voice processors used for speech compression and recognition. Methods to suppress noise are grouped according to how they obtain information about the noise and integrate that information into the suppression procedures.

Spectral subtraction methods use the Short Time Fourier Transform to transform the speech into magnitude spectrum. The noise bias is subtracted and the modified magnitude is recombined with the phase and inverse transformed. These methods vary according to the amount of the noise bias subtracted from the magnitude spectrum, the type of non-linear mapping applied to the magnitude spectrum, and the parameters of frequency analysis used.

In any event, based on such considerations, acoustic noise suppression is treated as a problem of finding the minimum mean square error estimate of the speech spectrum from a noisy version. This estimate equals an expected value of its conditional distribution given the noisy spectral value, the mean noise power and the mean speech power. It has been shown that speech is not Gaussian. This results in an optimal estimate which is a non-linear function of the spectral magnitude. Since both speech and Gaussian noise have a uniform phase distribution, the optimal estimator of the phase equals the noisy phase. This estimator has been calculated directly from noise-free speech. See a paper entitled OPTIMAL ESTIMATORS FOR SPECTRAL RESTORATION OF NOISY SPEECH by J. E. Porter and Steven F. Boll, Proc. Internatl. Conf. Acoust., Speech, and Sign. Proc., San Diego, CA, Mar., 1984.

The above noted paper describes how to find the optimal estimator for the complex spectrum, the magnitude, the squared magnitude, the log magnitude and the root magnitude spectra. According to this invention, the noisy distance is replaced with its expected value. Hence, as will be explained, the system and method requires two forms of information which are the expected values of the parameters and their variances. In regard to the above noted article, there is described the techniques for estimating the minimum means square error estimators. The article describes the optimal estimators necessary for each criterion function.

The optimal estimators are shown in FIG. 3. Each estimator is a function of the signal to noise ratio. This is demonstrated by computing the tables based upon signal-to-noise ratios of 0, 10, and 20 db.

Figure 2:
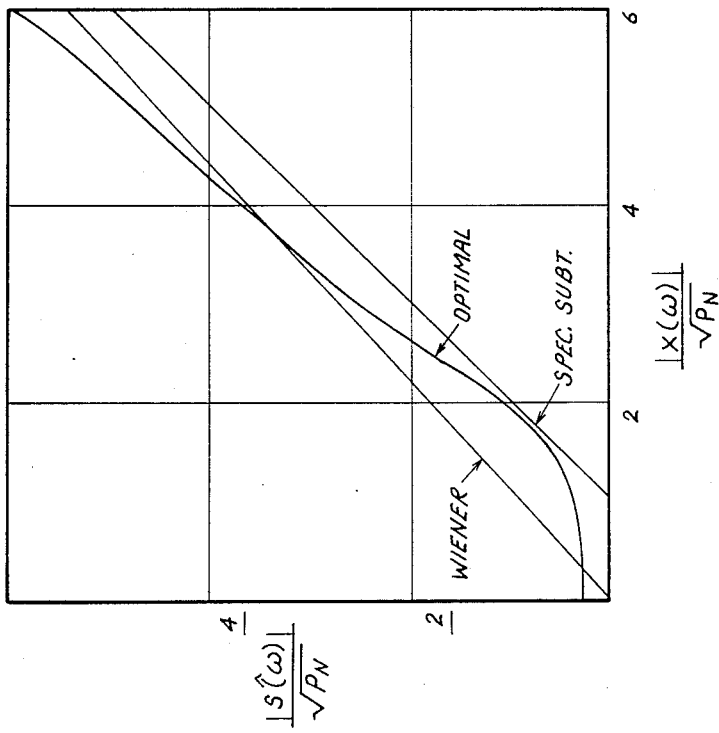
FIG. 2 is a graph depicting the optimal estimator averaged over all frequencies versus prior art estimators.
Figure 3C:
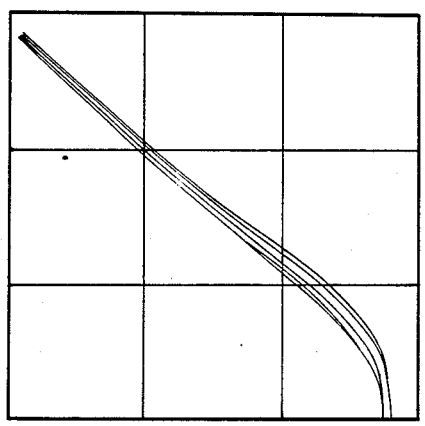
FIGS. 3a-3e are a series of graphs showing optimal estimator mappings for different functions of frequencies.
Figure 3B:
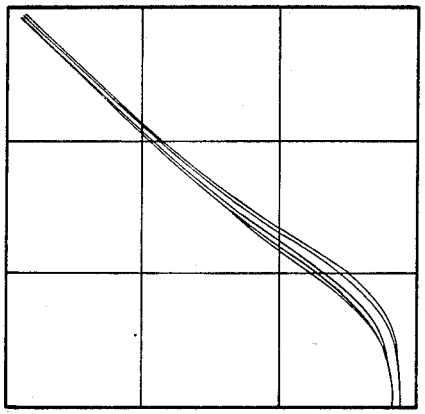
Figure 3A:
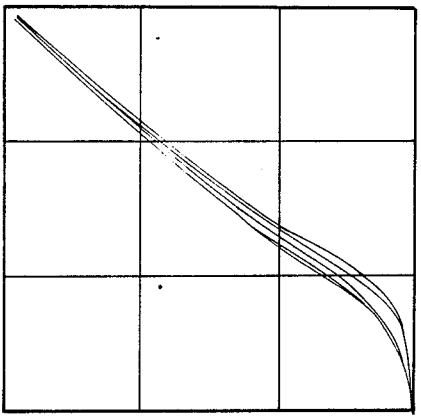
Figure 3E:
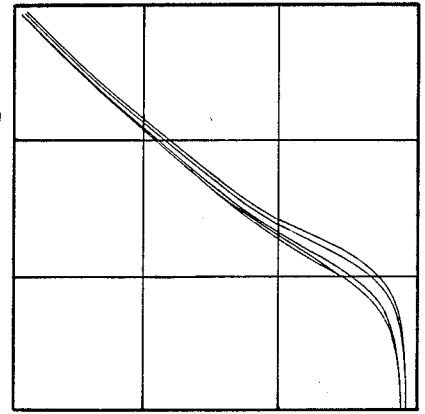
Figure 3D:
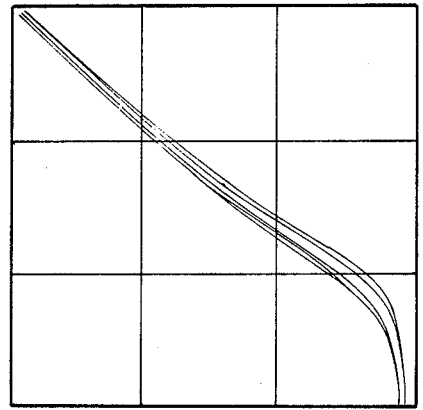

FIG. 4 gives an example of the SNR dependence for the complex spectrum estimate at a frequency of 1063 Hz. The article explains how the table values for the optimal estimators are arrived at and how the tables were generated to provide the data shown in FIGS. 2 and 3. The similar figures are employed in the article, and, essentially, the computation of optimal estimators is well known as explained in the article.

Before employing such estimators, one has to determine the estimation of the expected value which minimizes the mean square error and the estimation of the variance of the estimator in terms of pre-computed mean value tables. Thus the objective is to provide an unbiased estimator. The mathematics for determining the optimal estimators are included in the Appendix specified as Section II. The technique of determining the mean and variation of transformed optimal parameters is also included in the Appendix as Section III.

Section IV of the Appendix describes the technique of combining speech and noise in the bandpass filter domain. Thus the information as in regard to the expected values of the parameters as well as the variances are shown in the Appendix under Sections II, III, IV whereby these sections describe in great mathematical detail how to calculate the parameters.

Essentially, in consideration of the above, the new metric which will be explained is conceptually midway between squared Euclidean and log likelihood noise immune metric. The new metric is motivated by noticing that squared Euclidean metrics become noisy when the signal has additive noise.

This noise can be reduced by using the minimum mean squared error estimate of the actual squared Euclidean distance between template and unknown, conditioned by the noisy observations. This results in a squared Euclidean distance with the template and unknown values replaced by their optimal estimators derived in regard to the above noted Appendices. To this Euclidean distance is added the variance of the template estimate plus the variance of the unknown estimate. Mathematically, the minimum mean squared error estimate of the metric is defined as the expected value of the distance between noisy unknown and template frames according to the following algorithm:

$$\hat{d}^2 = E[(t_s - u_s)^2 | t_{s+n}, u_{s+n}, P_s, P_n]$$

where
$t_s$ = clean template
$u_s$ = clean unknown $t_{s+n}$ = noisy unknown
$P_s$ = Average Power of Speech
$P_n$ = Average Power of Noise Assume that the clean template and unknown are given by:

$$\hat{t}_s = t + \epsilon_t$$

$$u_s = \hat{u} + \epsilon_u$$

where:

$$E[t_s] = \hat{t}$$

$$E[u_s] = u$$

The quantities $\hat{t}$ and $\hat{u}$ are the expected values of the template and unknown. $\epsilon_t$ and $\epsilon_u$ are the zero mean estimation errors associated with the optimal estimator. Expressing the expected value in term of these values gives:

$$E[d^2(t,u)] = E[[(\hat{t}+\epsilon_t)-(u+\epsilon_u)]^2]$$

Expanding the expected value, and noting that:

$$E[\epsilon_t] = 0$$

$$E[\epsilon_u] = 0$$

$$E[\epsilon_t \epsilon_u] = 0$$

$$E[\epsilon_t^2] = \sigma_t$$

$$E[\epsilon_u^2] = \sigma_u$$

where $\sigma_t$ and $\sigma_u$ are the variances of these estimates, gives $$d^2 = (\hat{t}-u)^2 + \sigma_t^2 + \sigma_u^2$$

Notice that this metric model reduces to a standard Euclidean norm in the absence of noise. The metric model is also symmetric and can be applied when either the template or unknown or both are noisy.

Values for these means and variances are obtained by table lookup. These tables are generated using filterbank parameters as described in Appendix IV.

To establish that the metric was working properly two types of experiments were conducted: First scatter plots of clean distances versus noisy filterbank parameters were generated and superimposed with the euclidean metrics using noisy and optimal parameters and with the optimal parameters plus the variance terms. Second, wordspotting runs with these parameters and metrics were made.

VERIFICATION OF THE EXPECTED VALUE

Figure 9:
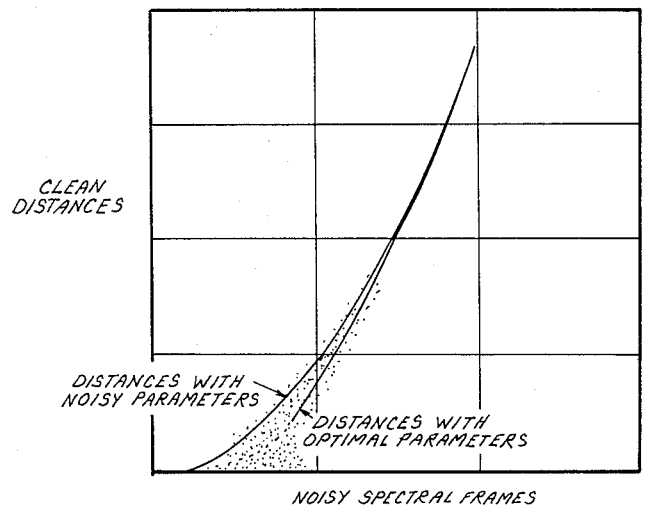
FIG. 9 to 11 are graphs depicting clean distance and alternative metrics versus noisy unknown parameters for given template frames.
Figure 10:
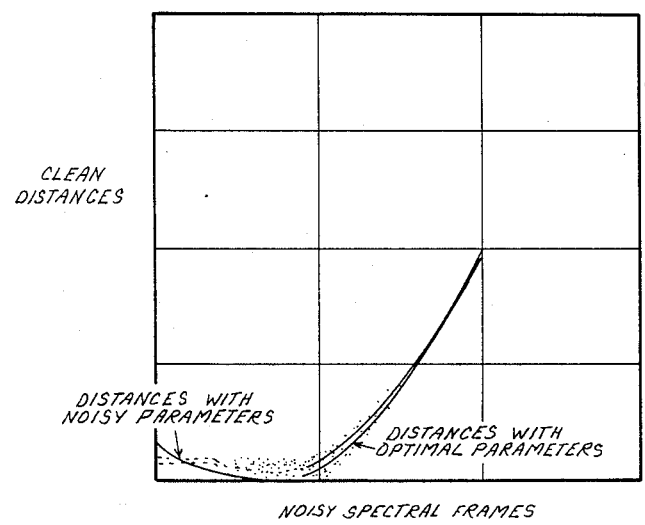
Figure 11:
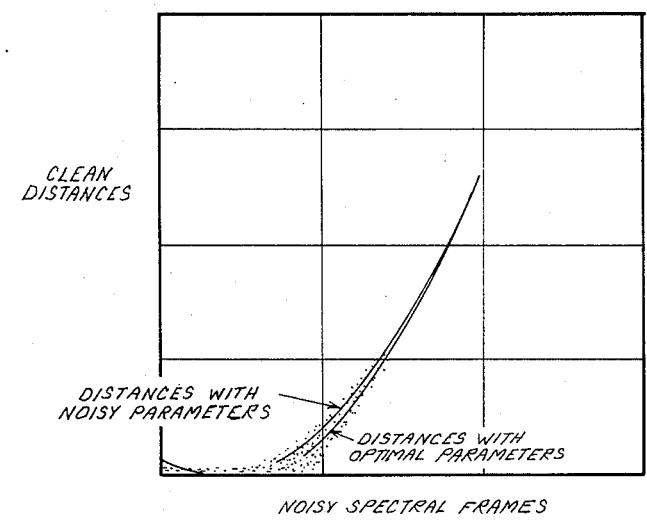
Figure 12:
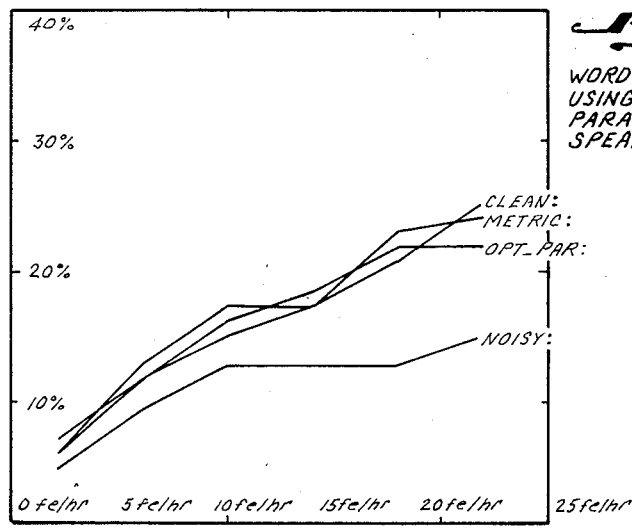
FIGS. 12 to 17 are a series of graphs depicting wordspotting performance using unnormalized parameters according to this invention.
Figure 13:
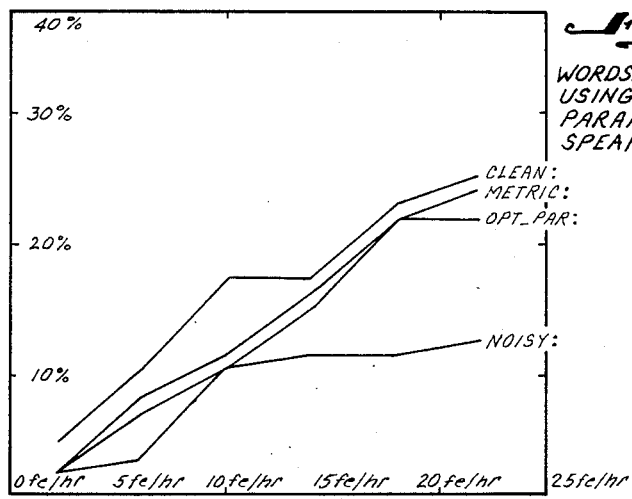
Figure 14:
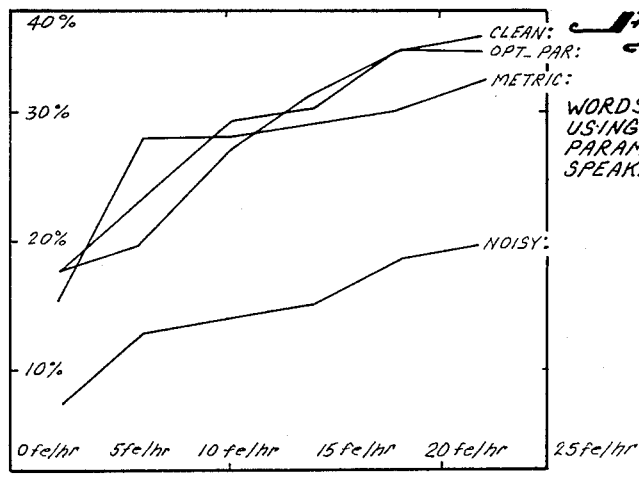
Figure 15:
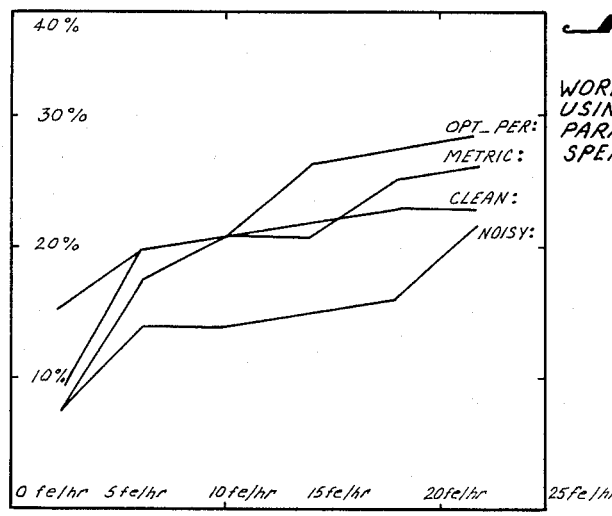
Figure 16:
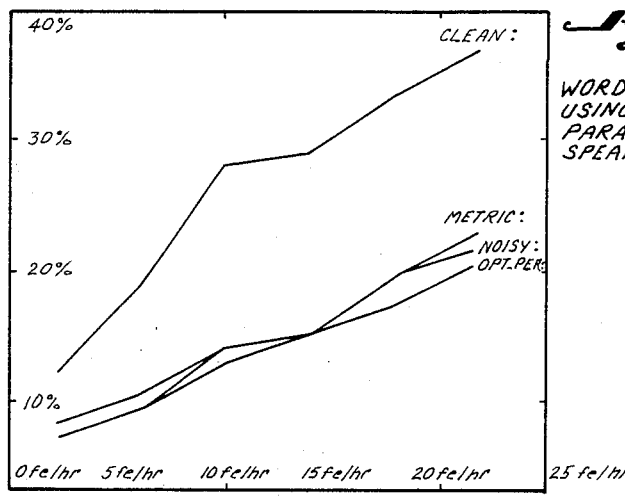
Figure 17:
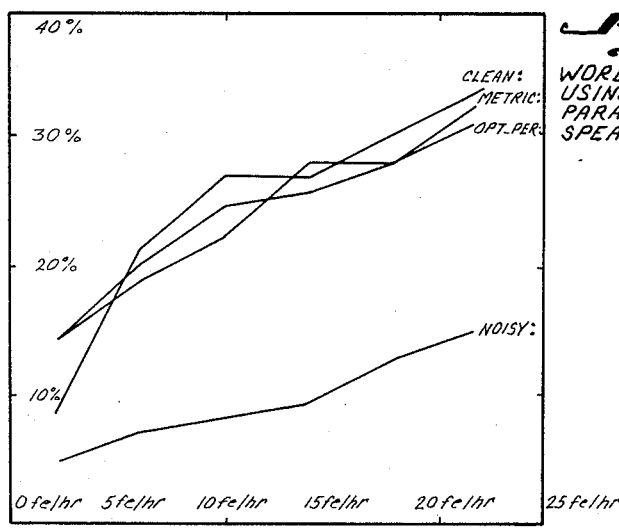

In the same manner as shown in Appendix IV the validity of the noise metric as a conditional expected value can be examined by plotting clean distances versus noisy parameters. The distance requires a noisy unknown frame and a clean or noisy template frame. In order to plot in just two dimensions, the template frame was held constant and a set of distances were generated for various unknown conditions and metrics. Three template frames, 0, 10, and 50 were selected from the Boonsburo template of speaker 50 representing the minimum, average and maximum spectral values. Distances and spectral outputs from the ninth filter were selected as approximately representing to the average signal to noise ratio over the entire baseband. FIGS. 9 through 11 show the scatter data along with the noisy distance, (straight parabola), euclidean distance with optimal parameters, and the noisy metric.

For this single channel, single template frame configuration, there is little difference between using just the optimal parameters and the parameters plus the variance term. However in each case the noisy metric passes through the mean of the clean distances given the noisy unknown parameter. The dark band in each figure corresponds to distances where the clean speech was near zero, resulting in a distance equal to the square of the template parameter. Since the optimal parameter tables where trained on speech only frames, the mean distance is not biased by this non-speech concentration. Note that for large values of the noise parameter, that all three distances agree. This is to be expected, since the mean has approached the identity and the variance has approached zero (See FIGS. 9 and 10).

REDUCTION IN MEAN SQUARE ERROR

The mean square error for each of these cases was also computed. The error was calculated as:

$$\text{error} = \Sigma(\text{distance}_{processed} - \text{distance}_{clean})^2$$

As expected the error reduced monotonically going from noisy to the optimal parameters, to the noise metric. Below is the computed mean square error between clean distance and the distances computed with each of following parameters: noisy, optimal estimator and optimal estimator plus variance, i.e., noise metric. The distance is straight Euclidean, i.e. the sum of the squares between the unknown spectral values minus the template spectral values. These distances for the mean square error calculation, were computed by selecting the 10th frame from the Boonsburo template for speaker 50 and dragging it by 1100 speech frames from the first section of WIJA. The average mean square error values are:

TABLE 5.1

| Average Mean Square Error Values | |
|---|---|
| Condition | mse |
| noisy - clean | 9.4 |
| optimal parameters - clean | 3.3 |
| noise metric - clean | 2.5 |

Although this represents only a course examination of performance, it does demonstrate that the metric is performing as desired. A more realistic test requires examining its performance in a wordspotting experiment as defined below.

WORDSPOTTING USING UNNORMALIZED PARAMETERS

The wordspotter was modified to use unnormalized 4th root parameters and Euclidean distance with or without the variance terms added. All other aspects of the wordspotting program remained the same, i.e. standard blind deconvolution, overlap removal, biasing, etc. Results are presented using the same scoring procedure as described in App. III. The table shows the average ROC curve differences for each template talker.

| Wordspotting Results Using Unnormalized Parameters | | | | | | | |
|---|---|---|---|---|---|---|---|
| Condition | 50 | 51 | joco | gara | chwa | caol | ave |
| clean | −19 | −19 | −7 | −15 | −10 | −12 | −13.6 |
| noisy | −25 | −27 | −21 | −21 | −21 | −26 | −13.3 |
| Optimal Params Only | −20 | −23 | −8 | −14 | −22 | −12 | −16.6 |
| Noise Metric | −20 | −22 | −9 | −16 | −22 | −12 | −16.7 |

Although overall performance using unnormalized parameters is lower than using normalized features, these experiments show some interesting characteristics. Specifically, for five of the six template talkers, use of the optimal parameters and/or the noise metric returned performance to levels nearly equal to the clean unknown data. This degree of restoration is not found in the normalized case. Stated another way, normalization tends to minimize the deleterious effect of noise and the restoring effect of the optimal parameters.

NOISE METRIC USING NORMALIZED PARAMETERS

In a preliminary development of the noise metric, the analysis used first order terms in the power series expansion of the reciprocal square root. Use of only first order terms leads to results which differ slightly from the results when second order terms are included. The development with second order terms is given below. Wordspotting performance is presented using the corrected formulation.

BACKGROUND

Let $\bar{x}, \tilde{x}, \hat{x}$ represent noisy, noise-free and estimated noise-free parameter vectors, and let primes denote $l_2$ normalization:

$$\bar{x}' = \frac{\bar{x}}{|\bar{x}|}$$

The (unnormalized) estimator error is $$\bar{\epsilon} = \hat{x} - \bar{x}$$

We define $\eta$ to be the error in estimating the normalized noise-free parameters by normalizing the (unnormalized) estimator, $$\bar{\eta} = \frac{\hat{x}}{|\hat{x}|} - \frac{\tilde{x}}{|\tilde{x}|} = \frac{\hat{x}}{|\hat{x}|} - \frac{\hat{x} - \bar{\epsilon}}{|\hat{x} - \bar{\epsilon}|}$$

$\bar{\eta}$ can be expressed to first order in $\epsilon$ as $$\bar{\eta} = \frac{1}{|\hat{x}|}\left(I - \frac{\hat{x}\hat{x}^t}{|\hat{x}|^2}\right)\bar{\epsilon}$$

The previous analysis proceeded to use this first order approximation as a basis for computing the effect of second order statistics of $\bar{\epsilon}$, in the form of variances of the components of $\bar{\epsilon}$. This leads to the conclusion, for example, that expected value of $\bar{\eta}$ is zero since the expected value of $\bar{\epsilon}$ is $$E(\bar{\epsilon}) = E(\hat{x} - \bar{x}|\bar{x})$$

which is zero when we ignore cross channel effects. This treatment is inconsistent and leads to error, as second order effects are ignored some places and used in other places. The previous analysis can be corrected by carrying all second order terms in $\bar{\epsilon}$ forward. This leads, among other things, to the result that the expectation of $\bar{\eta}$ is not zero.

The analysis is now repeated by carrying forward all second order terms in $\bar{\epsilon}$. Other than this change, the development is little different from the previous one. When the expectation of the noise-free $l_2$ - normalized distance given the noisy observations has been expressed to second and higher order in $\bar{\epsilon}$ we will then assume third moments vanish and then ignore cross-channel covariances.

We start from the definition of the noise-free distance given the noisy observations:

$$E(d'|\bar{x}_u{}^*, \bar{x}_t{}^*) = E\left(\left|\frac{\tilde{x}_u}{|\tilde{x}_u|} - \frac{\tilde{x}_t}{|\tilde{x}_t|}\right|^2 \bigg| \bar{x}_u{}^*, \bar{x}_t{}^*\right)$$

To simplify notation, we drop the notation specifying the noisy observation conditioning. Then, using the fact that we are dealing with unit vectors, the expected value can be expressed in terms of dot products as:

$$E(d'|\bar{x}_u{}^*, \bar{x}_t{}^*) = 2 - 2E\left(\frac{\tilde{x}_u \cdot \tilde{x}_t}{|\tilde{x}_u||\tilde{x}_t|}\right)$$

$$= 2 - 2E\left(\left(\frac{\hat{x}_u}{|\hat{x}_u|} - \bar{\eta}_u\right) \cdot \left(\frac{\hat{x}_t}{|\hat{x}_t|} - \bar{\eta}_t\right)\right)$$

where $\bar{\eta}$ is defined above. Expanding the dot products give:

$$E(d'|\bar{x}_u{}^*, \bar{x}_t{}^*) = 2 - 2\frac{\hat{x}_u \cdot \hat{x}_t}{|\hat{x}_u||\hat{x}_t|} +$$

$$2\frac{\hat{x}_u}{|\hat{x}_u|} \cdot E(\bar{\eta}_t) + 2\frac{\hat{x}_t}{|\hat{x}_t|} \cdot E(\bar{\eta}_u) - 4E(\bar{\eta}_u \cdot \bar{\eta}_t)$$

The product term in $\bar{\eta}_u$ and $\bar{\eta}_t$ is an interesting problem. For the most part, the error term $\bar{\eta}$ will be the result of noise, and noise at the template recording and at the unknown recording are very reasonably assumed to be uncorrelated, so approximately, $$E(\bar{\eta}_u \bar{\eta}_t) = E(\bar{\eta}_u) E(\bar{\eta}_t)$$

But this not quite correct, as the expectation is over speech and noise. Correlations between $\bar{\eta}_u$ and $\bar{\eta}_t$ can therefore arise due to the speech aspect of the expectation, (and, in fact, it can be expected to differ in match and no-match conditions). Fortunately, in the present analysis, where we're willing to have templates treated as noise free, $\bar{\eta}_t = 0$ and the problem doesn't arise.

We continue by computing the expectation of a clean normalized parameter vector. Since the treatment applies to both template and unknown, we don't distinguish between them.

$$E(\bar{x}') = E\left(\frac{\tilde{x}}{|\tilde{x}|}\right) = E\left(\frac{\hat{x} - \bar{\epsilon}}{|\hat{x} - \bar{\epsilon}|}\right) = x E\left(\frac{1}{|\hat{x} - \bar{\epsilon}|}\right) -$$

$$E\left(\frac{\bar{\epsilon}}{|\hat{x} - \bar{\epsilon}|}\right)$$

or

-continued $$E(\bar{x}') = \frac{\hat{x}}{|\hat{x}|} E\left(\frac{1}{\sqrt{1-\Delta}}\right) - \frac{1}{|\hat{x}|} E\left(\frac{\bar{\epsilon}}{\sqrt{1-\Delta}}\right)$$

where $$\Delta = \frac{2\hat{x}^t\bar{\epsilon} - |\bar{\epsilon}|^2}{|\hat{x}|^2}$$

To second order:

$$\frac{1}{\sqrt{1-\Delta}} = 1 + \frac{\Delta}{2} + \frac{3}{8}\Delta^2 + 0_3(\Delta)$$

so $$E\left(\frac{1}{\sqrt{1-\Delta}}\right) = 1 + \frac{1}{2} E\left(\frac{2x^t\bar{\epsilon} - |\bar{\epsilon}|^2}{|\hat{x}|^2}\right) +$$

$$\frac{3}{8} E\left(\frac{4}{|\hat{x}|^4} x^t\bar{\epsilon}\bar{\epsilon}^t x\right) + E(0_3(\bar{\epsilon}))$$

and $$E\left(\frac{\epsilon}{\sqrt{1-\Delta}}\right) = 1 + \frac{x^t}{|x|^2} E(\bar{\epsilon}) - \frac{tr(cov(\bar{\epsilon}))}{2|x|^2} +$$

$$\frac{3}{2} \frac{x^t cov(\bar{\epsilon})x}{|x|^4} + E(0_3(\bar{\epsilon})).$$

Also $$E\left(\frac{\epsilon}{\sqrt{1-\Delta}}\right) = E(\bar{\epsilon}) + \frac{1}{2} E\left(\frac{2}{|\hat{x}|^2} \bar{\epsilon}\hat{x}^t\bar{\epsilon}\right) + E(0_3(\epsilon))$$

$$= E(\bar{\epsilon}) + \frac{cov(\bar{\epsilon})\hat{x}}{|\hat{x}|^2} + 0_3(\bar{\epsilon})$$

Substituting these in the expression for the expectation of $\bar{x}$ gives $$E(\bar{x}') = E\left(\frac{\bar{x}}{|\bar{x}|}\right) =$$

$$\frac{\hat{x}}{|\hat{x}|}\left[1 + \frac{\hat{x}^t}{|\hat{x}|} E(\bar{\epsilon}) - \frac{tr(cov(\bar{\epsilon}))}{2|\hat{x}|^2} + \frac{3}{2} \frac{\hat{x}^t cov(\bar{\epsilon})\hat{x}}{|\hat{x}|^4}\right] -$$

$$\frac{E(\bar{\epsilon})}{|\hat{x}|} - \frac{cov(\bar{\epsilon})x}{|\hat{x}|^3} + E(0_3(\bar{\epsilon}))$$

This expression for the expectation of the noise-free normalized parameter vector is true for any estimator $\hat{x}$ which is a function of the noisy observations. It is complete in the second order of residual error of the estimator, hence is an adequate model for computing the effect of second order statistics. We now specialize to the optimal estimator we have been using. (Notice we have made no simplifying assumptions yet.)

First some subtler points. From the definition of $\eta$, we have $$E(\bar{\eta}_u|\bar{x}_u^*,\bar{x}_t^*) = E\left(\frac{\hat{x}_u}{|\hat{x}_u|} - \frac{\bar{x}_u}{|\bar{x}_u|} |\bar{x}_u^*,\bar{x}_t^*\right)$$

Expanding, $$E(\bar{\eta}_u|\bar{x}_u^*,\bar{x}_t^*) = \frac{\hat{x}_u}{|\hat{x}_u|} - E\left(\frac{\bar{x}_u}{|\bar{x}_u|} |\bar{x}_u^*,\bar{x}_t^*\right) =$$

$$\frac{\hat{x}_u}{|\hat{x}_u|}\left[-\frac{\hat{x}_u^t}{|\hat{x}_u|} E(\bar{\epsilon}_u|\bar{x}_u^*,\bar{x}_t^*) + \frac{tr(cov(\bar{\epsilon}_u))}{2|\hat{x}_u|^2} +$$

$$\frac{3}{2} \frac{\hat{x}^t cov(\bar{\epsilon}_u)x}{|\hat{x}|^4}\right] - \frac{E(\bar{\epsilon}_u|\bar{x}_u^*,\bar{x}_t^*)}{|\hat{x}|} - \frac{cov(\bar{\epsilon}_u)x}{|\hat{x}|^3} + E(0_3(\bar{\epsilon}))$$

Since it is not known whether a distance calculation is for a match or no match condition, correlation which exist between the template and the error in the unknown cannot be used. It is therefore reasonable to make:

Assumption 1a:

$$E(\bar{\epsilon}_u|\bar{x}_u,\bar{x}_t) = E(\bar{\epsilon}_u|\bar{x}_u)$$

Assumption 1b:

$$cov(\bar{\epsilon}_u|x_u,\bar{x}_t) = cov(\epsilon|\bar{x}_u)$$

Since the expectation of a vector is a vector of expectations, $$E(\bar{\epsilon}_u|\bar{x}_u^*) = E(x_u - \bar{x}_u|\bar{x}_u^*)$$

$$= (E(x_{u,1} - x_{u,1}|\bar{x}_u^*), \ldots, E(x_{u,n} - x_{u,n}|\bar{x}_u^*))^t$$

and each component can be expressed $$E(\hat{x}_{u,i} - x_{u,i}|\bar{x}_u) = \hat{x}_{u,i} - E(x_{u,i}|\bar{x}_u)$$

where $$E(x_{u,i}|\bar{x}_u) = E(x_{u,i}|x_{u,1}, \ldots, x_{u,n})$$

Our optimal estimators are derived independently for each channel; that is, $$\hat{x}_{u,i} \equiv E(x_{u,i}|x_{u,i})$$

In doing this, we ignore inter-channel dependencies. Thus we make

Assumption (2a) For any i $$E(x_{u,i}|\bar{x}_u) = E(x_{u,i}|x_{u,i})$$

Assumption (2b) For any i $$var(x_{u,i}|\bar{x}_u) = var(x_{u,i}|x_{u,i})$$

The effect of assumptions (1a) and (2a) is to make $$E(\bar{\epsilon}_u | \bar{x}_u^*,\bar{x}_t^*) = 0$$

$$E(\bar{x}_u') = \frac{\hat{x}_u}{|\hat{x}_u|}\left[1 - \frac{tr(cov(\bar{\epsilon}_u))}{2|\hat{x}_u|^2} + \frac{3}{2} \frac{\hat{x}_u^t cov(\bar{\epsilon}_u)\hat{x}_u}{|\hat{x}_u|^4}\right] -$$

$$\frac{cov(\bar{\epsilon}_u) \hat{x}_u}{|\hat{x}_u|^3} + E(0_3(\bar{\epsilon}_u))$$

Next we make the necessary assumptions needed to compute the estimator residual error statistics. We have the within-channel variances, but don't want to deal with the multitude of cross-channel covariances or higher moments. So we make Assumption (3a)

$$\text{cov}(\bar{\epsilon}_u \mid \bar{x}_u^*) = \begin{vmatrix} \hat{\sigma}_1^2 & . & 0 \\ . & . & . \\ 0 & . & \hat{\sigma}_n^2 \end{vmatrix}$$

where $$\hat{\sigma}_i^2 = \text{var}(x_{u,i} \mid \bar{x}_u^*),$$

Assumption (3b) Higher order moments of $\bar{\epsilon}_u$ vanish, i.e.

$$E(O_3(\bar{\epsilon}_u)) = 0$$

Under these conditions, the expectation of the $i^{th}$ component of the normalized parameter vector is $$E(\bar{x}_{u,i}') = \frac{\hat{x}_{u,i}}{|\hat{x}_u|} \left[ 1 - \beta_u - \frac{\hat{\sigma}_{u,i}^2}{|\hat{x}|^2} \right],$$

where $$\beta_u = \frac{1}{2|\hat{x}_u|^2} \sum_i \hat{\sigma}_i^2 \left( 1 - 3 \frac{\hat{x}_{u,i}^2}{|\hat{x}|^2} \right)$$

To find the noise immune metric, we first need the expectation of $\bar{\eta}$.

$$E(\bar{\eta}_u) = E\left( \frac{\hat{x}_u}{|\hat{x}_u|} - \frac{\bar{x}_u}{|x_u|} \right)$$
$$= \frac{\hat{x}_u}{|\hat{x}_u|} - E(\bar{x}_u')$$

and using the expression above, we find the components of this expectation are given by $$E(\eta_{u,i}) = \frac{\hat{x}_{u,i}}{|\hat{x}_u|} \left( \beta_u + \frac{\hat{\sigma}_{u,i}^2}{|\hat{x}_u|^2} \right)$$

and similarly for the template vector, when assumptions 1 through 3 are extended to it.

As shown in the first part of this section, $$E(d' \mid \bar{x}_u^*, \bar{x}_t^*) = 2 - 2 \frac{\hat{x}_u \hat{x}_t}{|\hat{x}_u||\hat{x}_t|} + 2 \frac{\hat{x}_u}{|\hat{x}_u|} E(\bar{\eta}_t) -$$

$$4E(\bar{\eta}_u \bar{\eta}_t) + 2 \frac{\hat{x}_t}{|\hat{x}_t|} E(\bar{\eta}_u)$$

To estimate it using the previous results, we formalize previous remarks with Assumption 4:

$$E(\bar{\eta}_u \bar{\eta}_t) = E(\bar{\eta}_u) E(\bar{\eta}_t)$$

Then

-continued
$$E(d' \mid \bar{x}_u^*, \bar{x}_t^*) = 2 - 2 \frac{\hat{x}_u \cdot \hat{x}_t}{|\hat{x}_u||\hat{x}_u|} + 2 \sum_i \frac{\hat{x}_{u,i} \hat{x}_{t,i}}{|\hat{x}_u||\hat{x}_t|}$$

$$\left[ \left( \beta_t + \frac{\hat{\sigma}_{t,i}^2}{|\hat{x}_t|^2} \right) - 2 \left( \beta_u + \frac{\hat{\sigma}_{u,i}^2}{|\hat{x}_u|^2} \right) \left( \beta_t + \frac{\hat{\sigma}_{t,i}^2}{|\hat{x}_t|^2} \right) + \right.$$

$$\left. \left( \beta_u + \frac{\hat{\sigma}_{u,i}^2}{|\hat{x}_u|^2} \right) \right] =$$

$$2 - 2 \sum_i \frac{\hat{x}_{u,i} \hat{x}_{t,i}}{|\hat{x}_u||\hat{x}_t|} [1 - \gamma_{t,i} - \gamma_{u,i} + 2\gamma_{t,i}\gamma_{u,i}]$$

where $$\gamma_{u,i} = \beta_u + \frac{\hat{\sigma}_{u,i}^2}{|\hat{x}_u|^2}$$

$$\beta_u = \frac{1}{2|\hat{x}_u|^2} \sum_i \hat{\sigma}_{u,i}^2 \left( 1 - 3 \frac{\hat{x}_{u,i}^2}{|\hat{x}_u|^2} \right)$$

and $\gamma$ and $\beta$ are defined similarly for the template.

In the wordspotting case, we generally assume the template is noise free, so the $\beta$ and $\gamma$ terms for the template vanish. In that case the result simplifies to $$E(d' \mid \bar{x}_u^*, \bar{x}_t) = 2 - 2 \sum_i \frac{\hat{x}_{u,i} \bar{x}_{t,i}}{|\hat{x}_u||\bar{x}_t|} \left( 1 - \beta - \frac{\hat{\sigma}_{u,i}^2}{|\hat{x}_u|^2} \right)$$

where $$\beta = \frac{1}{2|\hat{x}_u|^2} \sum_i \hat{\sigma}_{u,i}^2 \left( 1 - 3 \frac{\hat{x}_{u,i}^2}{|\hat{x}_u|^2} \right)$$

WORDSPOTTING RESULTS

Wordspotting runs were made with and without the corrected metric on 10 dB noisy speech. The table lists the results of the wordspotting experiments. The standard scoring approach is given. That is, for each condition and each template talker, the number represents the average amount that the ROC curve differs from a selected baseline consisting of speaker 50 on clean unknown speech.

The legend for the table is as follows:

base: clean templates vs. clean unknowns base_noisy: clean templates vs. noisy unknowns at 10 dB SNR base_opt: clean templates vs. optimally restored unknowns.

TABLE

| Condition | Wordspotting Performance | | | | | |
|---|---|---|---|---|---|---|
| | 50 | 51 | joco | gara | chwa | caol | ave |
| base | 3 | 7 | 9 | 15 | 3 | 17 | 9.0 |
| base noisy | −12 | −18 | −2 | −3 | −10 | −6 | −8.5 |
| base opt | −10 | −12 | 2 | −2 | −17 | 1 | −6.3 |

Figure 18:
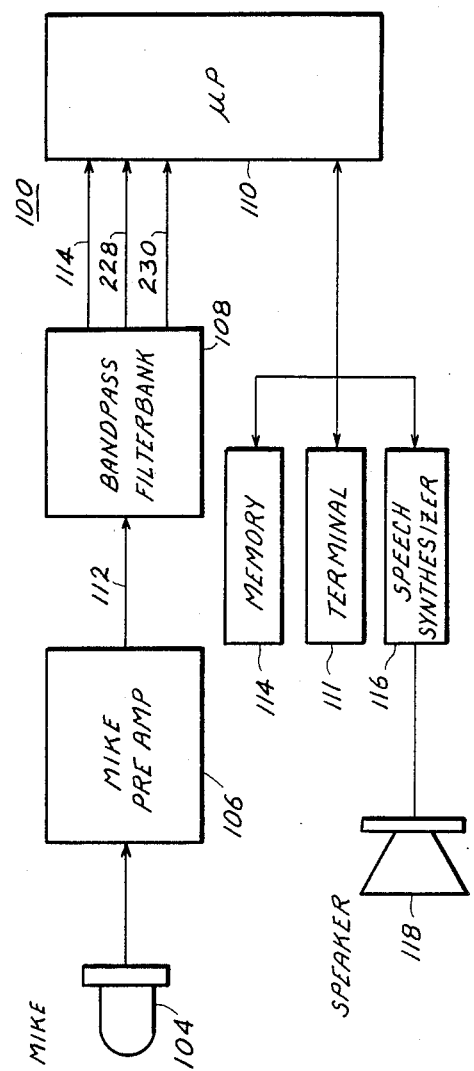
FIG. 18 is a simple block diagram of a word recognition apparatus which can be employed with this invention.
Figure 19:
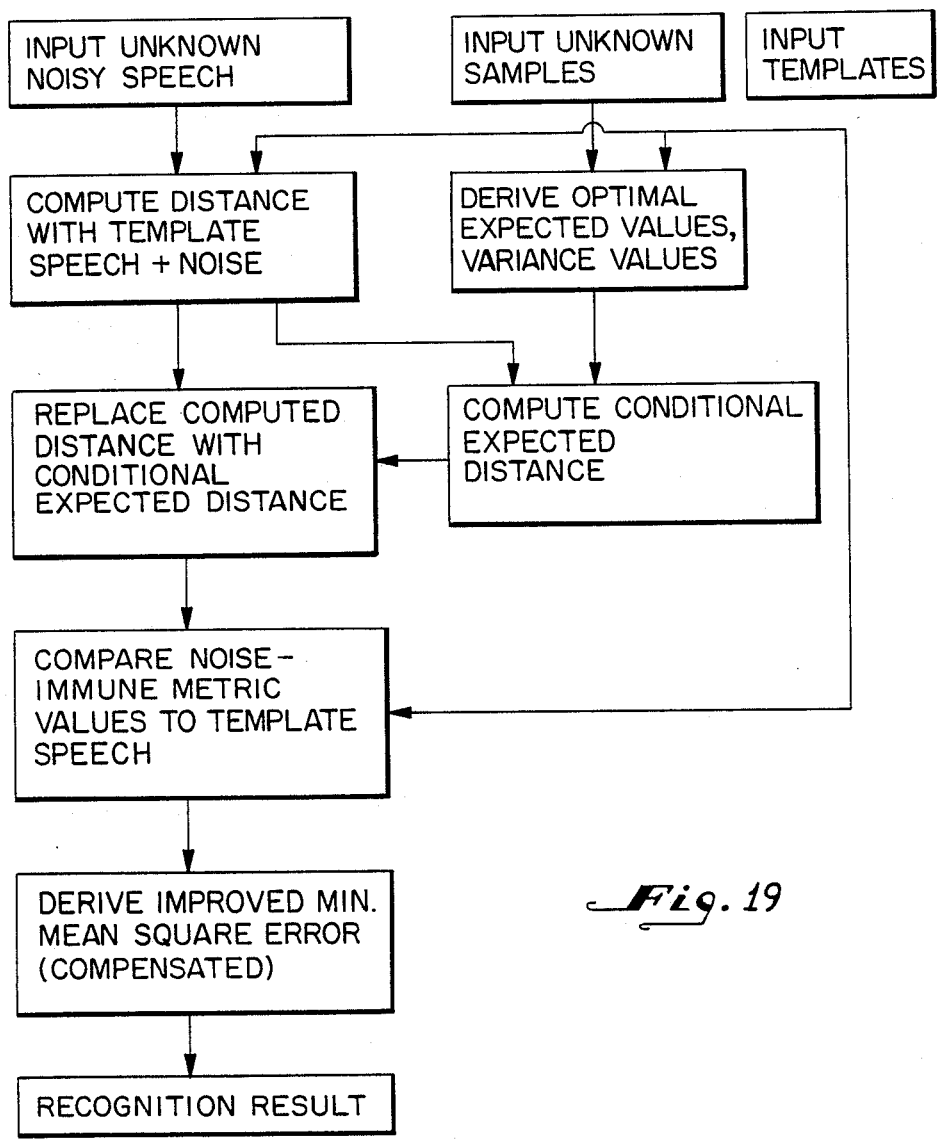
FIG. 19 is a flow chart illustrating the method for compensating for noisy input speech employed in the invention.

Referring to FIG. 18, there is shown a simple block diagram of a speech recognizer apparatus which can be employed in this invention. Essentially, the speech recognizer includes an input microphone 104 which microphone has its output coupled to a preamplifier 106. The output of the preamplifier is coupled to a bank of bandpass filters 108. The bank of bandpass filters is coupled to a microprocessor 110. The function of the microprocessor is to process the digital inputs from the bandpass filter bank and to process the digital inputs in accordance with the noise immune distance metric described above.

Also shown in FIG. 18 are an operator's interface 111, a non-volatile mass storage device 114 and a speech synthesizer 116. Examples of such apparatus are well known in the field. See for example, a patent application entitled APPARATUS AND METHOD FOR AUTOMATIC SPEECH RECOGNITION, Ser. No. 473,422, filed on Mar. 9, 1983, now U.S. Pat. No. 4,624,008 for G. Vensko et al and assigned to the assignee herein.

As indicated above, the algorithm or metric which has been described is suitable for operation with any type of speech recognizer system, and hence the structures of such systems are not pertinent as the use of the above described algorithm will enhance system operation. In any event, as indicated above, such speech recognition systems operate to compare sound patterns with stored templates. A template which is also well known is a plurality of previously created processed frames of parametric values representing a word, which when taken together form the reference vocabulary of the speech recognizer. Such templates are normally compared in accordance with predetermined algorithms such as the dynamic programming algorithm (DPA) described in an article by F. Ita-Kura entitled MINIMUM PROTECTION RESIDUAL PRINCIPLE APPLIED TO SPEECH RECOGNITION, IEEE Transactions, Acoustics, Speech and Signalling Processing, Vol. ASSP-23, pages 67–72, Feb. 1975.

The algorithm allows one to find the best time alignment path or match between a given template and a spoken word. Hence as should be apparent from FIG. 18, modern speech recognition systems employ templates and incorporate such templates in computer memory for making a comparison of the templates with the digital signals indicative of unknown speech sounds which signals are developed in the bandpass filter bank. The techniques for generating the digital signal from unknown speech signals have been extensively described in regard to the above noted co-pending application.

See also a co-pending application entitled A DATA PROCESSING APPARATUS AND METHOD FOR USE IN SPEECH RECOGNITION, filed on Mar. 9, 1983, Ser. No. 439,018, now U.S. Pat. No. 4,567,606 by G. Vensko et al and assigned to the assignee herein. This co-pending application describes a continuous speech recognition apparatus which also extensively employs the use of templates. In any event, as can be understood from the above, this metric compensates for noise by replacing the noisy distance with its expected value. Hence a speech recognizer operates to measure the similarity between segments of unknown and template speech by computing, based on an algorithm, the Euclidean distance between respective segment parameters. The addition of noise to either the unknown speech or the template speech or both causes this distance to become either too large or too small. Hence based on the algorithm of this invention, the problem is solved by replacing the noisy distance with its expected value. In order to do so, as explained above, there are two forms of information required. The first is the expected values of the parameters and the second is their variance.

Thus based on the above description, as further supplemented by Appendices II, III and IV, there is described the necessary calculations to enable one to calculate the required parameters while the specification teaches one how to combine the parameters to form the noise immune metric. As indicated, the processing can be implemented by the system shown in FIG. 18 by storing both the parameters and their variances in either memory 114 or in the microprocessor memory 110.

In accordance with the invention, a method of compensating for noisy input speech in order to improve the recognition result of the speech recognition apparatus comprises the following steps for producing an improved minimum mean square error estimate conditioned by compensatory characteristics of the noisy input speech:

(a) computing optimal estimated distance values over the given range of frequenciesfor noise-free template speech, based upon comparing known speech segments, which are input in a noise-free environment and converted into corresponding templates of known speech signals $t_s$, with unknown speech segments, which are input in a noise-free environment and converted to unknown speech signals $u_s$;

(b) computing estimated variance values corresponding to the optimal estimated distance values for a sample population of noise-free speech segments;

(c) storing said optimal estimated distance values and variance values on a look-up table associated with the template speech;

(d) computing squared distance values over the given range of frequencies for input noisy unknown speech signals $u_{s+n}$ compared with signals $t_{s+n}$ representing template speech to which a spectral representation of noise n in the actual input environment is added;

(e) replacing the computed squared distance values for the unknown speech signals with conditional expected distance values calculated using the optimal estimated distance values and variance values obtained from the look-up table, in order to derive noise-immune metric values for the unknown speech signals; and (f) computing the minimum mean square error of the noise-immune metric values for the unknown speech signals compared with the noise-free template speech signals, whereby an improved recognition result is obtained.

In regard to the above, the implementation of the noise immune distance metric is mathematically explained in Appendix V. Appendix V describes how the metric or algorithm can be stored into an existing metric which is widely known in the field as the Olano metric. As indicated, noise immunity is obtained in this system by replacing the Euclidean square distance between the template and unknown frames of speech by its conditional expectation of the square distance without noise, given the noisy observations. As can be seen from Appendix V, the conditional expected value is the minimum means square error estimate of the distance.

It, therefore, will reduce the noise on the frame-to-frame distance values to its minimum possible value for given data. In order to implement the use of the above described system, the noise metrics can be installed in any system by substituting the optimal parameter values as derived and as explained and by augmenting the feature vector with the variance information. Thus for each signal frame which, as indicated above, is implemented in a voice recognition system by means of the bandpass filter outputs after they have been digitized, one performs the following steps:
1. Replace (by table lookup) the noisy estimate with optimal estimate.
2. Obtain the variance, (also by table lookup).
3. Normalize the filterbank parameters.
4. Normalize the variance to account for parameter normalization.
5. Augment the feature vectors with the variance information.

The mathematics, as indicated, are explained in great detail in Appendix V and particularly show how to modify the Olano metric.

The following Appendices are included herein and are referred to during the course of the specification to establish the mathematics used in accordance with this invention:
1. Appendix II—OPTIMAL ESTIMATORS FOR RESTORATION OF NOISY DFT SPECTRA.
2. Appendix III—MEAN AND VARIANCE OF TRANSFORMED OPTIMAL PARAMETERS.
3. Appendix IV—COMBINING SPEECH AND NOISE IN THE BANDPASS FILTER DOMAIN.
4. Appendix V—UNORMALIZED NOISE METRIC STUDIES.

APPENDIX II

OPTIMAL ESTIMATORS FOR RESTORATION OF NOISY DFT SPECTRA

This Appendix considers processes which optimally restore the corrupted spectrum, $x = s + 1c$ to a spectrum which minimizes the expected value of the norm squared error between a function of the clean speech, $f(s)$, and the same function of the estimate, $f(\hat{s})$, using only the noisy spectrum $x$ and the average noise energy at each frequency, $P_N$. The restoration is done for each frequency individually, and any correlation which might exist between spectral values at different frequencies is ignored. The functions, $f$, to be considered include:

$$f(s) = |s|, f(s) = |s|^2, f(s) = \sqrt{|s|}, f(s) = \log|s|, \text{ and } f(s) = s$$

These compression functions are commonly used in both speech recognition and speech compression applications. Having optimal estimators for each case allows the estimation to be matched to the type of compression used prior to the distance calculation. That is if the recognizer matches cepstral parameters, then the appropriate function to select would be log, etc. The power function was estimated to measure performance differences with spectral subtraction techniques based on the power function. Each of these minimizations is described below.

ESTIMATING THE MAGNITUDE SPECTRUM

Many speech recognition algorithms are sensitive only to spectral magnitude information. Human perception is also generally more sensitive to signal amplitude than to phase. A speech enhancement system used to restore speech for human listeners, or as a preprocessor for an automatic speech recognition device, might therefore be expected to perform better if it is designed to restore the spectral magnitude or power, ignoring phase. In this case, appropriate optimization criterion functions, $f$, are:

$$f(s) = |s|,$$

or $$f(s) = |s|^2,$$

and the optimal restoration function will minimize the ensemble average of the error quantity $$E[(|\hat{s}| - |s|)^2 | x, P_N]$$

or $$E[(|\hat{s}|^2 - |s|^2)^2 | x, P_N].$$

ESTIMATING THE COMPRESSED MAGNITUDE SPECTRUM

Studies of audition suggest that there is an effective compression active in some perceptual phenomena (especially the sensation of loudness). Some speech recognition devices also incorporate compression in the feature extraction process. This suggests the criterion function:

$$f(s) = c(|s|)$$

where $c$ is a compression function. In this case, the optimal restoration function will minimize the ensemble average of the error quantity $$E[(c(|\hat{s}|) - c(|s|))^2 | x, P_N]$$

We shall consider two compression functions: the logarithm and the square root.

Note that since the cepstrum is the Fourier Transform of the logarithm of the magnitude spectrum, and the Fourier Transform is a linear process, minimization of the mean square error in the cepstrum is obtained when the optimality criterion is $f(s) = \log|s|$.

ESTIMATING THE COMPLEX SPECTRUM

Adopting the identity function for $f$, leads to a complex spectrum estimator which minimizes the error quantity $$E[|\hat{s} - s|^2 | x, P_N].$$

RELATION TO WIENER FILTER

By integrating over all time, the Wiener filter minimize the mean square error of a time waveform estimate, subject to the constraint that the estimate is a linear function of the observed values. In the time domain the Wiener filtering operation can be represented as a convolution, and in the frequency domain as multiplication by the filter gain function. At a single frequency the Wiener filter spectrum estimate is therefore a constant times the corrupted spectrum value, $x$ i.e. a linear function of the spectral magnitude. If speech spectral values, $s$, had a Gaussian distribution, then the spectrum estimator which minimizes the error quantity mentioned above would also be linear, i.e., a constant times $x$. However, the distribution of speech differs greatly from a Gaussian distribution, and the true optimal estimator function is highly non-linear. FIG. 1 shows the cumulative distribution of real speech spectral magnitudes and the cumulative distribution of the spectral magnitude of a complex Gaussian time signal of equal power. The speech distribution was obtained using a 1000 frame subset from the 27,000 magnitude frames used to compute the estimators described in the implementation section. The Gaussian signal was generated by averaging 20 uniformly distributed random numbers of equal energy. The optimal linear estimator, corresponding to a Wiener filter, is shown with the non-linear estimator averaged over all frequencies and the mapping for Spectral Subtraction in FIG. 2.

2.2.4. Minimum Mean Square Error Estimators

The minimum mean square error estimate of a function of the short-term speech spectral value is the a posteriori conditional mean of that function given the speech and noise statistics and the noisy spectral value. This estimate can be calculated as follows. Let f represent the function of the spectrum to be estimated. Let s and x be clean and noisy complex spectral values, respectively, and n the complex noise. Let f (s) denote the optimal estimator of the function f (s) and let $E\{.\}_p$ denote expectation with respect to the probability distribution p. Then the minimum mean square estimate is given by:

$$\hat{f}(s) = E\{f(s)\}_{s|x} = \int f(s) p(s|x) ds.$$

When speech and noise are independent, $$p(x|s) = p(s+n|s) = p_n(n) = p_n(x-s),$$

where $p_n$ is the a priori noise density function. Thus the density of the joint distribution of clean and noisy spectral values is given by:

$$p(s,x) = p(x|s) p_s(s) = p_n(x-s) p_s(s),$$

Where $p_s$ is the a priori speech probability density. Substituting gives $$\begin{aligned}
\hat{f}(s) &= \int f(s) \frac{p(a,x)}{p(x)} ds \\
&= \frac{\int f(s) p_n(x-s) p_s(s) ds}{\int p_n(x-a) p_s(s) ds} \\
&= \frac{E\{f(s) p_n(x-a)\}_s}{E\{p_n(x-a)\}_s}
\end{aligned}$$

Thus, the optimal estimator, $\hat{f}(s)$, equals the ratio of expected values of two random variables with respect to the distribution of clean speech spectra.

SPECIALIZATION TO A GAUSSIAN NOISE MODEL

Assume that the noise has a zero mean, is uniform in phase, and has a Gaussian distribution with power $P_N$. Then the noise density function is:

$$p_n(n) = \gamma \exp(-|n|^2/P_N)$$

where $\gamma$ is a normalization factor.

Substituting x−s for n in the expression for the optimal estimator gives:

$$\hat{f}(s) = \frac{\int f(s) \exp((2\,Re(xs^*) - |s|^2)/P_N) p_s(s) ds}{\int \exp((2\,Re(xs^*) - |s|^2)/P_N) p_s(s) ds}$$

Clean speech spectral values are observed to be uniformly distributed in phase so $p_s(s)$ depends only on $|s|$. The density, $p_{|s|}$, of $|s|$ on the positive real line is then related to $p_s$, the density of s, in the complex plane by:

$$p_s = \frac{p_{|s|}}{2\pi |s|}$$

The integrals in the expression for the optimal estimator are evaluated in the complex plane using polar coordinates. Using the fact that $$\int_0^{2\pi} \cos(n\gamma) \exp(2|x||s|\cos(\psi - \gamma)/P_N) d\gamma =$$

$$2\pi I_n(2|x||s|/P_N)$$

where $I_n$ is the nth order modified Bessel function, the integrals can be reduced to the real line.

Two cases are considered, $f(s) = s$ and $f(s) = c(|s|)$, where c is a compression function to be specified.

In the first case the estimator reduces to:

$$\hat{s} = e^{i\psi} \frac{\int |s| \exp(-|s|^2/P_N) I_1(2|x||s|/P_N) p_{|s|} d|s|}{\int \exp(-|s|^2/P_N) I_0(2|x||s|/P_N) p_{|s|} d|s|}.$$

where $\psi$ is the phase of the corrupted spectral value, x. This shows that the phase of the best estimate of the complex spectral value is the noisy phase.

In the second case the estimator reduces to:

$$c(|\hat{s}|) = \frac{\int c(|s|) \exp(-|s|^2/P_N) I_0(2|x||s|/P_N) p_{|s|} d|s|}{\int \exp(-|s|^2/P_N) I_0(2|x||s|/P_N) p_{|s|} d|s|}$$

EVALUATION USING A LARGE SAMPLE OF SPEECH

The estimates given above can be evaluated by interpreting them as ratios of expectations with respect to the distribution of $|s|$ on the real line. Each integral in the expressions above is an expected value with respect to the distribution of $|s|$, as characterized by its density, $p_{|s|}$. These expected values are functions of $|s|$, $|x|$ and $P_N$. They can be conveniently approximated as average values of the given functions summed over a large sample of clean speech.

Using the ratio of sample averages to approximate, the optimal estimator has the significant practical advantage that the a priori distribution of $|s|$ need not be known or approximated. In view of the significant error introduced by the fairly common erroneous assumption that speech spectral values have a Gaussian distribution, this distribution-free approach to finding the optimal estimator is particularly attractive. From a theoretical point of view, the ratio of sample averages can be defended as giving a consistent estimate of the optimal estimator. Although it is a biased estimate, the bias can, in practice, be made negligible by using a large sample. For this study, 27,000 samples of spectral magnitude were taken from the marked speech of the six males and two females in the X data base.

Of course, an optimal estimator obtained in this way is optimal with respect to the distribution of $|s|$ in the population of speech from which the sample is taken. We have observed the distribution of conversational speech spectral magnitude to be stable and reproducible when averaged over twenty seconds or more, and normalized with respect to the rms value after removal of silence. To make this normalization explicit, with respect to speech power, we introduce the normalized spectral magnitude:

$$\sigma \equiv |s|/\sqrt{P_S}$$

where $P_S$ is the average speech power in the sample S of speech.

TABLE GENERATION

The expressions given above for the optimal estimators can be expressed as tables in terms of the speech-to-noise ratio $SNR = P_S/P_N$, the noise power, $P_N$, and the distribution of the dimensionless clean speech spectral magnitude, $\sigma$. For restoration of speech it is convenient to implement an optimal estimator in the form of tables which gives the spectral component magnitude estimate as a function of the noisy spectral component magnitude, $|x|$, using a different table for each SNR value of interest. It has been found useful to normalize the table input and output by $\sqrt{P_N}$, since the tables are then only weakly dependent on SNR. Accordingly, we introduce the dimensionless input quantity:

$$\xi = |x|/\sqrt{P_N}.$$

Tables, $t(\xi, SNR)$, for estimating the complex spectrum, are then computed using the expressions above for $\hat{s}$, with the expectations converted to averages.

The estimator for the first case reduces to:

$$t(\xi, SNR) = |\hat{s}|/\sqrt{P_N} = \frac{\sum_{\sigma \in S} \sigma \sqrt{SNR} \exp(-\sigma^2 SNR) I_1(2\sigma\xi\sqrt{SNR})}{\sum_{\sigma \in S} \exp(-\sigma^2 SNR) I_0(2\sigma\xi\sqrt{SNR})}$$

The estimate is then implemented as:

$$\hat{s} = \sqrt{P_N} t(\xi, SNR) e^{i\vartheta}.$$

Defining $|\hat{s}|_c$ as the spectral component magnitude estimate which leads to the minimum mean square error in estimating the tables for $c(|s|)$ are defined by:

$$t_c(\xi, SNR) = |\hat{s}|_c/\sqrt{P_N}$$

$$t_c(\xi, SNR) = \frac{1}{\sqrt{P_N}} c^{-1} \left[ \frac{\sum_{\sigma \in S} c(\sigma\sqrt{SNR} \sqrt{P_N}) \exp(-\sigma^2 SNR) I_0(2\sigma\xi\sqrt{SNR})}{\sum_{\sigma \in S} \exp(-\sigma^2 SNR) I_0(2\sigma\xi\sqrt{SNR})} \right]$$

which, when the compression function c is any power or the logarithm function, reduces to $$t_c(\xi, SNR) =$$

$$c^{-1} \left[ \frac{\sum_{\sigma \in S} c(\sigma\sqrt{SNR}) \exp(-\sigma^2 SNR) I_0(2\sigma\xi\sqrt{SNR})}{\sum_{\sigma \in S} \exp(-\sigma^2 SNR) I_0(2\sigma\xi\sqrt{SNR})} \right].$$

The estimate is then implemented as:

$$|\hat{s}|_c e^{i\vartheta} = \sqrt{P_N} t_c(\xi, SNR) e^{i\vartheta}.$$

IMPLEMENTATION

The restoration procedure consists of generating a table for mapping noisy magnitude spectra into optimal estimates of the clean speech spectra. Values for the table are calculated using a large population of talkers to obtain a speaker independent process. The table is incorporated into a short time spectral analysis-synthesis program which replaces noisy speech with restored speech.

TABLE GENERATION

The optimal estimators are functions of the distribution of $|s|$ in the DFT frequency bin, the SNR in that bin, and the spectral magnitude $|x|$ of noisy signal divided by $P_N$. A large sample of conversational speech (27,000 frames) was taken from the wordspotting data base, and a Gaussian noise model was used to build a set of tables specifying the optimal estimates at a preselected set of five frequencies and three SNR values. The five frequencies selected were a subset of the center frequencies of the bandpass filterbank used to measure the spectral parameters in the speech recognition system. The frequencies were 300, 425, 1063, 2129, and 3230 Hz. The optimal estimator tables were calculated at each of these node frequencies. For the initial experiments, estimates at other DFT bin frequencies were obtained by linear interpolation from these five tables. Subsequent experiments used a single table representing the average over all frequencies.

GENERATION OF A REPRESENTATIVE SPEECH POPULATION

A marked data base, was used as a representative conversational speech sample for calculating the estimators. The data base consists of eight speakers (six males and two females). Each 10 ms frame of speech has been marked as either speech or non-speech by a trained listener, and only frames marked as speech were used.

For each frame, the DFT complex spectrum is calculated at each of the specified node frequency bins. A total of 27,000 frames of speech were used to estimate each table.

SIGNAL-TO-NOISE RATIO ESTIMATION

Table values for the optimal estimator are dependent upon the speech distribution and the noise power. Thus, they are dependent upon the local signal-to-noise ratio in each frequency bin. Tables were generated based on average signal-to-noise ratios, across all frequencies, of 0 dB, 10 dB, and 20 dB. At each of these levels the average noise power was measured.

Average speech power was measured separately by first generating a histogram of speech power from the multi-speaker conversational data base. The contribution in the histogram due to silence is suppressed by noting that non-speech manifests itself in the histogram as a chi-squared distribution at the low end of the histogram. Non-speech power is removed by subtracting a least squares fit to the chi-square distribution using the low end histogram samples from the overall distribution. Speech power is then calculated by summing the difference.

Table entries are computed for normalized magnitude values, $\xi$, from 0 to 10 in steps of 0.2. The table is linearly extended from 70. to 700. Each entry is calculated by specifying the value of $P_N$ based upon the average signal-to-noise ratio and the value of $\xi$. The tables are calculated by averaging over all speech samples at a given frequency.

OPTIMAL ESTIMATORS

The optimal estimators for each criterion function, f, are presented in FIG. 3. These tables were calculated based upon an average signal-to-noise ratio of 10 dB.

The estimator is a function of the signal-to-noise ratio. This is demonstrated by computing the tables based upon signal-to-noise ratios of 0, 10, and 20 dB. Examining the resulting estimator shows that the signal-to-noise ratio dependence is similar for all frequencies. FIG. 4 gives an example of the SNR dependence for the complex spectrum estimate at frequency 1063 Hz.

ANALYSIS-SYNTHESIS PROCEDURES

The analysis-synthesis procedures were implemented using an algorithm similar to that used to implement Spectral Subtraction. The input noisy speech was analyzed using 200 point, half-overlapped hanning windows. A 256-point DFT is taken and converted to polar coordinates. The magnitude spectrum is normalized at each frequency by the square root of the average noise spectrum, $P_N$. The restored magnitude spectrum is found using the optimal estimator tables at the five node frequencies and linearly interpolating at other frequencies.

EVALUATION ON CONNECTED DIGITS

The effectiveness of the estimator as a noise suppression preprocessor was measured both qualitatively by listening to the synthesis, and quantitatively by measuring the improvement in performance of a connected digit recognition algorithm using noisy speech with and without noise stripping at a signal-to-noise ratio of 10 dB. Recognition performance is compared with other approaches to noise stripping [8], performance without noise stripping, and performance using alternative optimality criterion functions, f.

RECOGNITION EXPERIMENT

The recognition experiment used a 3, 4, 5, and 7 connected digit data base spoken by eight talkers (four males and four females). Template information consisted of nine tokens per digit per speaker. Three of the tokens were spoken in isolation and six of the tokens were manually extracted. For each speaker there were 680 trials. The recognition experiments were done speaker dependently. The feature vectors from templates and unknowns were matched using a prior art metric. White Gaussian noise was added to the unknown data to give an average signal-to-noise ratio of 10 dB.

SUMMARY OF RESULTS

Results are presented in terms of recognition error rates averaged over eight speakers as a function of the type of preprocessing. Also given is the error rate and the percent recovery from the noisy error rate, i.e., $$\text{Percent Recovery} = 100\% * \frac{E.R_{Noisy} - E.R_{Processed}}{E.R_{Noisy} - E.R_{Clean}}$$

The need for two dimensional interpolation was also tested by collapsing the five frequency tables into a single averaged table. The averaged table for the root estimator is presented in FIG. 2.

| | The legend for the table is: |
|---|---|
| Clean: | Speech recorded using a 12 bit analog-to-digital converter in a quiet environment. |
| Noisy: | speech with Gaussian Noise added to give a 10 dB signal-to-noise ratio. |
| SS: | Noisy Processed by Spectral Subtraction [8] |
| Spectrum: | Noisy Processed by using $f(s) = s$. |
| Power: | Noisy Processed by using $f(s) = |s|^2$. |
| Mag: | Noisy Processed by using $f(s) = |s|$. |
| Root: | Noisy Processed by using $f(s) = \sqrt{|s|}$. |
| Single Table Root: | Noisy Processed by Single Table of Root |
| Log: | Noisy Processed by using $f(s) = \log|s|$. |

| Unknown | Template | Score (%) | Error Rate (%) | Recovery (%) |
|---|---|---|---|---|
| Clean | Clean | 98.4 | 1.6 | 100 |
| 10 dB | Clean | 58.1 | 41.9 | 0 |
| SS | Clean | 88.7 | 11.3 | 76 |
| Root | Clean | 89.8 | 10.2 | 79 |
| Root-Ave. | Clean | 88.6 | 11.4 | 76 |
| Log | Clean | 91.1 | 8.9 | 82 |
| Mag | Clean | 87.9 | 12.1 | 74 |
| Power | Clean | 81.2 | 18.8 | 57 |
| Spect | Clean | 86.5 | 13.5 | 70 |
| 10 dB | 10 dB | 96.4 | 3.6 | 95 |
| SS | SS | 95.5 | 4.5 | 93 |
| Spect | Spect | 96.5 | 3.5 | 95 |
| Power | Power | 97.6 | 2.4 | 98 |
| Mag | Mag | 97.7 | 2.3 | 98 |
| Log | Log | 97.9 | 2.1 | 99 |
| Root | Root | 97.9 | 2.1 | 99 |
| Root-Ave. | Root-Ave. | 97.8 | 2.2 | 99 |

OBSERVATIONS

Use of the optimal estimators reduces the error rate for a speaker dependent connected digit speech recognition experiment using a 10 dB signal-to-noise data base from 42% to 10%. In addition, by processing the template data in the same way as the unknown data, the error rate can be further reduced from 10% to 2%.

Standard Spectral Subtraction techniques perform at a level near those of the optimal estimator.

The use of a single table reduced performance by 1.1% compared to multiple tables when the recognizer used clean templates, but resulted in essentially no degradation when the recognizer used processed templates.

LISTENING TESTS

Informal listening tests were conducted to compare the alternative forms of processing. The results can be divided into roughly three characterizations: (1) speech plus musical noise; (2) speech plus white noise; and, (3) a blend of 1 and 2. The spectral subtraction, SS and complex spectral estimate, Spect, clearly fall in the first category. The Mag and Pow estimates are characterized by the second category. Finally, the Root and Log processes are characterized by the third category.

These results can be correlated with the transfer function characteristics by noting how the low amplitude signals are treated. When the low amplitude magnitudes are severely attenuated, as in the Spect and SS options, the spectrum is "more spike-like" with many narrow bands of signal separated by low energy intervals giving rise to the musical quality. When the low amplitude signals are set to a constant, as in the Mag and Pow options, the effect is to fill in between the spikes with white noise.

APPENDIX III

MEAN AND VARIANCE OF TRANSFORMED OPTIMAL PARAMETERS

Introduction

This section addresses two topics: estimation of the magnitude value which minimizes the mean square error between compressed magnitudes; and estimation of the variance of the estimator in terms of precomputed mean value tables. This section shows that using this approach to magnitude estimation produces an unbiased estimator. It also shows that for monomial compression functions such as square root or power, the variance can be calculated directly from the mean tables.

Optimal Magnitude Estimator

Define the output power in a bandpass channel (either BPF or DFT), to be P in the absence of noise, with magnitude, $M = \sqrt{P}$. Define $P^*$ as the noisy power due to the presence of stationary noise with mean power value $P_n$. Let the mean power value of the clean speech signal be $P_s$. The general form for the optimal estimator, $\overline{c(M)}$ of $c(M)$ (not necessarily a compressed function of the magnitude), which minimizes the error quantity:

$$E_c = E\{|c(M) - \overline{c(M)}|^2\}_{P(M|P_0,P_n,P^*)}$$

is the conditional expected value:

$$\overline{c(M)} = E\{c(M)\}_{P(M|P_0,P_n,P^*)}$$

In Appendix IV there is desired methods for computing estimators of the spectral magnitude, $M = \sqrt{P}$, which minimize this mean square error, with respect to various compression functions, c. The compression functions considered include the identity, log, square and square root. This section presents this formulation again from a perspective which emphasizes the relation between the compression function and the conditional expected value.

The optimal magnitude estimator $\hat{M}_c$ must satisfy $$c(\hat{M}_c) = \overline{c(M)}.$$

We can solve for $\hat{M}_c$ by considering compression functions c which are one to one on the real line, $R^+$, and thus have inverses on this domain. Then $$\hat{M}_c = c^{-1}(\overline{c(M)}) = c^{-1}[E\{c(M)\}_{P(M|P_0,P_n,P^*)}]$$

The Optimal Estimator As a Table Lookup

Our method of computing $\hat{M}_c$ uses the distribution of the noise (assumed to be Guassian) and the distribution of clean speech. The Gaussian noise is completely characterized by its mean power $P_n$. We assume that the speech power is scaled by $P_s$. Thus normalizing the instantaneous speech power by $P_s$, results in a fixed distribution which is obtained from any sample of speech, by just normalizing.

Under these conditions and also that c is a power or the logarithm, it can be shown that a scaling factor can be extracted from $\hat{M}_c$, permitting the table lookup to be a function of two variables. We chose to use $\sqrt{P_n}$, as it had dominant effect.

The optimal estimator is implemented as a table lookup with $\sqrt{P^*/P_n}$ as the argument and $SNR = P_s/P_n$ as a parameter, i.e., different tables for different values of SNR. Define the estimator, $M_c$ in terms of the table $t_c$ as:

$$\hat{M}_c = \sqrt{P_n t_c} (\sqrt{P^*/P_n} ; SNR)$$

where $t_c$ represents the table lookup function based upon compression function c. Solving for $t_c$ gives:

$$t_c(\sqrt{P^*/P_n} ; SNR) = \frac{1}{\sqrt{P_n}} c^{-1}[E\{c(M)\}_{P(M|P_0,P_n,P^*)}]$$

The form actually implemented normalizes M by $\sqrt{P_n}$ first before forming the expected values.

Compression Functions

We use various compression functions applied to the magnitude to form the recognition parameters. For example, the Olano metric uses the square root of magnitude. In general, we get a recognition parameter, x, from compression function k on the magnitude:

$$x = k(M).$$

In the presence of noise we use the optimal estimator for M rather than the noisy value. Suppose we use the optimal estimator $\hat{M}_c$. Then we will be using recognition parameters:

$$\hat{x} = k(\hat{M}_c).$$

which will differ from the true, noise-free value by $$\epsilon = k(\hat{M}_c) - k(M).$$

Statistics of Recognition Parameters

In this section we derive the statistics of the recognition parameters with respect to noise effects. Thus $$\epsilon = k(\sqrt{P_n t_c} (\sqrt{P^*}/P_n, SNR)) - k(M)$$
$$= k(c^{-1}E[c(M)]) - k(M)$$

When the compression functions k and c are the same, $$\epsilon = E\{c(M)\} - c(M)$$

Evaluating the bias of the estimator gives:

$$E\{\epsilon\} = E\{E\{c(M)\} - c(M)\}$$
$$= E\{c(M)\} - E\{c(M)\}$$
$$= 0$$

So that in this case the estimator is unbiased.

The variance of the estimation parameters can be obtained as:

$$\text{var}(\bar{x}) = E\{\epsilon^2\}$$
$$= E\{c(M)^2\} - (E\{c(M)\})^2$$
$$= E\{c^2(M)\} - (E\{c(M)\})^2$$

Since $$E\{c(M)\} = c(\hat{M}_c)$$

substituting for $\hat{M}_c$ gives:

$$E\{c(M)\} = c[\sqrt{P_n t_c} (\sqrt{P^*/P_n} ;SNR)]$$

By the same approach, when $c^2$ is one to one on the real line, $R^+$, and thus has an inverse, $$E\{c^2(M)\} = c^2 \hat{M}_c s$$

then $$E\{c^2(M)\} = c^2[\sqrt{P_n t_c} \, s(\sqrt{P^*/P_n} ;SNR)]$$

so $$\text{var}(\bar{x}) = c^2[\sqrt{P_n t_c} \, s(\sqrt{P^*/P_n} ;SNR)] -$$
$$(c[\sqrt{P_n t_c} (\sqrt{P^*/P_n} ;SNR)])^2$$

or $$\text{var}(\bar{x}) = c^2[\sqrt{P_n t_c} \, s(\sqrt{P^*/P_n} ;SNR)] -$$
$$c^2[\sqrt{P_n t_c} (\sqrt{P^*/P_n} ;SNR)]$$

where $t_c s$ is the table lookup estimator for the compression function $c^2 = c \times c$, (multiplication of functions not composition).

Variance of the Square Root Estimator

If we use Olano parameters (before normalization) with a square-root c table, $c = \sqrt{}$, denoted by r, and $c^2 = id$. In that case $$\text{var}(\bar{x}) = \sqrt{P_n t_m} (\sqrt{P^*/P_n} ;SNR) - \sqrt{P_n t_r} (\sqrt{P^*/P_n} ;SNR)$$
$$= \sqrt{P_n} [t_m - t_r]$$

Where $t_m$ and $t_r$ are the tables for the magnitude and root estimators.

Variance of the Magnitude Estimator

If we were to use magnitude values themselves without compression as the recognition parameters, $c = id$ and $c^2$ is the square law, which we have called p. In that case $$\text{var}(\bar{x}) = (\sqrt{P_n t_p})^2 - (\sqrt{P_n t_{id}})^2$$
$$= P_n (t_p^2 - t_{id}^2).$$

Examples of Mean and Variance Data

Figure 6:
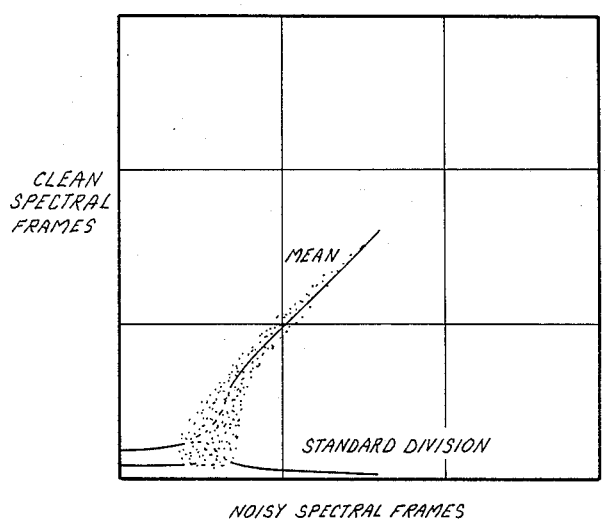
FIG. 6 is a mean and standard deviation plotted against noisy versus clean speech and silence frames.

Mean and variance data based upon the square root function were generated with frames marked with SxSy categories 0 through 5 and displayed with two types of scatter plots. Spectral outputs from the ninth filter were selected as approximately representing the average signal to noise ratio over the entire baseband. FIG. 5 shows the clean verses noisy 4th root of power spectral frames using just speech frames. In FIG. 6 both speech and non-speech frames are included. Along any vertical axis the estimator lies at the mean value. Likewise the standard deviation represents about 30 percent of the scatter away from the mean. The dark band in FIG. 6 corresponds to frames where the clean speech was near zero. Since the optimal parameter tables where trained on speech only frames, the mean distance is not biased by this non-speech concentration.

APPENDIX IV

COMBINING SPEECH AND NOISE IN THE BANDPASS FILTER DOMAIN

Introduction

This section derives the probability density function for the noisy filterbank parameter, X, given the clean filterbank parameter, S, P(X|S). This density describes how speech and noise combine in the filterbank domain. It is needed in order to generate the conditional expected value, $\hat{S}$, and its variance, of the clean filterbank parameter given the noise parameter, E[S|X]. As discussed in Appendix III, this conditional expected values, $\hat{S}$, minimizes the mean square error:

$$E[(\hat{S}-S)^2|X].$$

Each bandpass filter, BPF channel is modeled as the sum of independent DFT channels. The number of independent channels will be less than or equal to the number of bins combined to form a filterbank output.

Each DFT channel is modeled as an additive complex process, with the signal $s^k \xi^k + i\eta^k$ in the kth channel and noise $n^k = \xi_n^k + i\eta_n^k$. The noise is assumed Guassian and uniformly distributed in phase. Define the noisy signal as, $$x^k = s^k + n^k = (\xi^k + \eta^k) + i(\lambda_n^k + \eta_n^k)$$

The noisy channel signals add as:

$$\sum_k |x^k|^2 = \sum_k (\xi^k + \xi_n^k)^2 + (\theta^k + \eta_n^k)^2$$

We assume the noise in each independent channel has the same value, $\sigma_n$, (to be determined). Then the density of the noisy signal given the clean signal in the complex plane is:

$$P(x^k|s^k) = \frac{1}{2\pi\sigma_n^2} \exp\left(-\frac{|x^k - s^k|^2}{2\sigma_n^2}\right) =$$

$$\frac{1}{2\pi\sigma_n^2} \exp\left(-\frac{\xi_n^{ks} + \eta_n^{ks}}{2\sigma_n^2}\right)$$

Let X be the BPF channel output with noise and S the BPF channel output without noise.

The joint density of the individual channel observation $(x^1, \ldots, x^\chi)$ given the signal values, $(s^1, \ldots, s^\chi)$, is the product density:

$$P(x^1, \ldots, x^\chi | \delta^1, \ldots, \delta^\chi) = \frac{1}{(2\pi)^\chi \sigma_n^{2\chi}} \exp\left(-\frac{1}{2\sigma_n^2} \sum_{k=1}^{\chi} (\xi_n^k)^2 + (\eta_n^k)^2\right)$$

$$= \frac{1}{(2\pi)^\chi \sigma_n^{2\chi}} \exp\left(-\frac{1}{2\sigma_n^2} \sum_{k=1}^{\chi} |x^k - a^k|^2\right)$$

where $\chi$ is the number of individual channels.

We see that the conditional distribution of X given the $\chi$ signal values $(s^1, \ldots, s^\chi)$, is just the distribution of a sum of squares of $2\chi$ normal variates which are independent, each having variance $\sigma_n^2$, and means $\xi^1$, $\eta^1$, $\xi^2$, $\eta^2$, $\ldots$, $\xi^\chi$, $\eta^\chi$. This is the non-central chi-squared distribution in $2\chi$ degrees of freedom.

Kendall and Stewart (Vol. II, page 244, Advanced Theory of Statistics) shows that the density of the quantity $$Z = \sum_{i=1}^{n} x_i^2,$$

where each $x_i$ is unit variance Guassian with mean $\mu_i$, (all independent) is $$P(Z) = P(Z|\mu_1, \ldots, \mu_n) =$$

$$\frac{e^{-(Z+\lambda)/2} Z^{(n-2)/2}}{2^{n/2}} \sum_{r=0}^{\infty} \frac{\lambda^r Z^r}{2^{2r} r! \Gamma(r + (n/2))}$$

where $$\lambda = \sum_{i=1}^{n} \mu_i^2.$$

(We note that the density of Z depends on the means $\mu_1, \ldots, \mu_n$, only through the sum of their squares, $\lambda$, which is fortuitous, as it makes the density of X depend on the individual DFT channel means $(\xi^k, n^k)$, through the sum of their squares, which is S).

To apply this, note that $$\frac{X}{\sigma_n^2} = \sum_{k=1}^{\chi} \left(\frac{\xi_n^k}{\sigma_n} + \frac{\xi^k}{\sigma_n}\right)^2 + \left(\frac{\eta_n^k}{\sigma_n}\right)^2$$

showing that $X/\sigma^2$ is distributed as the sum of $2\chi$ unit variance, independent Gaussians with means $$\frac{\xi^1}{\sigma_n}, \frac{\eta^1}{\sigma_n}, \ldots, \frac{\xi^k}{\sigma_n}, \frac{\eta^\chi}{\sigma_n}.$$

Therefore the density of $$\frac{X}{\sigma_n^2} \text{ is}$$

$$P\left(\frac{X}{\sigma_n^2} \bigg| \frac{\xi^1}{\sigma_n}, \frac{\eta^1}{\sigma_n}, \ldots, \frac{\xi^\chi}{\sigma_n}, \frac{\eta^\chi}{\sigma_n}\right) =$$

$$\frac{e^{-\frac{1}{2}\left(\frac{X}{\sigma_n^s} + \lambda\right)}}{2^\chi} \left(\frac{X}{\sigma_n^2}\right)^{\chi-1} \sum_{r=0}^{\infty} \frac{\lambda^r \left(\frac{X}{\sigma_n^2}\right)^r}{2^{2r} r! \Gamma(\chi + r)}$$

where $$\lambda = \sum_{k=1}^{\chi} \left(\frac{\xi^k}{\sigma_n}\right)^2 + \left(\frac{\eta^k}{\sigma_n}\right)^2 = \frac{S}{\sigma_n^2}$$

So $$P(X|S) = \sigma_n^{-2} P\left(\frac{X}{\sigma_n^2} \bigg| \frac{\xi^1}{\sigma_n}, \ldots, \frac{\eta^\chi}{\sigma_n}\right) =$$

$$\frac{1}{\sigma_n^2 2^\chi} e^{-\frac{1}{2}\left(\frac{X+S}{\sigma_n^s}\right)} \left(\frac{X}{\sigma_n^2}\right)^{\chi-1} \sum_{r=0}^{\infty} \frac{\left(\frac{SX}{\sigma_n^4}\right)^r}{2^{2r} r! \Gamma(\chi + r)}$$

Simplification Using Bessel Functions

Abramowitz and Stegin (AMS55) formula 9.6.1 shows that the modified Bessel function of the first kind of order $v$ is $$I_v(Z) = \left(\frac{Z}{2}\right)^v \sum_{k=0}^{\infty} \frac{(Z^2/4)^k}{k! \Gamma(v + k + 1)}$$

$$= \left(\frac{Z}{2}\right)^v \sum_{k=0}^{\infty} \frac{Z^{2k}}{2^{2d} k! \Gamma(v + k + 1)}$$

Therefore, $$I_{X-1}\left(\frac{\sqrt{SX}}{\sigma_n^2}\right) = \left(\frac{\sqrt{SX}}{2\sigma_n^2}\right)^{X-1} \sum_{r=0}^{\infty} \frac{\left(\frac{SX}{\sigma_n^4}\right)^r}{2^{2r} r! \Gamma(X+r)}$$

Comparing this with the expression for $P(X|S)$, see that $$P(X|S) = \frac{1}{2\sigma_n^2}\left(\sqrt{\frac{X}{S}}\right)^{X-1} e^{-\frac{1}{2}(\frac{X+S}{\sigma_n^s})} I_{X-1}\left(\frac{\sqrt{SX}}{\sigma_n^2}\right)$$

For later use, we note the special case, obtainable directly from the power series expansion, $$P(X|S=0) = \frac{1}{\sigma_n^2 2^X \Gamma(X)} \left(\frac{X}{\sigma_n^2}\right)^{X-1} e^{-\frac{X}{2\sigma_n^s}}$$

This agrees exactly with the (central) chi-squared distribution in $2\chi$ degrees of freedom, as it should.

Determination of the Number of Independent Degrees of Freedom

The special case $S=0$ predicts that the BPF channel will pass Guassian noise yielding outputs with the statistics of the chi squared distribution with $2\chi$ degrees of freedom. The mean and variance are $$\text{mena }(X|S=0) = 2\chi\sigma_n^2$$
$$\text{var }(X|S=0) = 4\chi\sigma_n^4$$

Let's define $P_n$ to be the mean noise power in the channel with no signal present: that is $$P_n = \text{mean}(X|S=0) = 2\chi\sigma_n^2,$$
$$\text{var}(P_n) = \text{var}(X|S=0) = 4\chi\sigma_n^4$$

Therefore, $$\chi = \frac{P_n^2}{\text{var}(P_n)}$$

$$\sigma_n^2 = \frac{\text{var}(P_n)}{2P_n}$$
$$= \frac{P_n}{2\chi}$$

By measuring the average and the variance of the output of the BPF channel, we can therefore estimate the properties of the channel by the way it passes Gaussian noise. The channel can be characterized by any two of the four parameters $\chi, \sigma_n^2, P_n, \text{var}(P_n)$.

We choose $\chi$ and $P_n$ because the former should be independent of the channel input and the second should be a constant gain times the variance or power of the input noise.

Density In Terms of Measurement Parameters

The model predicts the distribution of noisy output, given the clean output, in terms of the channel characteristic $\chi$, and the noise-only mean output $P_n$:

$$P(X|S) = \frac{\chi}{P_n}\left(\sqrt{\frac{X}{S}}\right)^{X-1} e^{-\chi\left(\frac{X+S}{P_n}\right)} I_{X-1}\left(\frac{2\chi\sqrt{SX}}{P_n}\right)$$

and, in the special case of noise only, $$P(X|S=0) = \frac{\chi^\chi}{P_n\Gamma(\chi)}\left(\frac{X}{P_n}\right)^{X-1} e^{\frac{-X}{P_n}}$$

Figure 7:
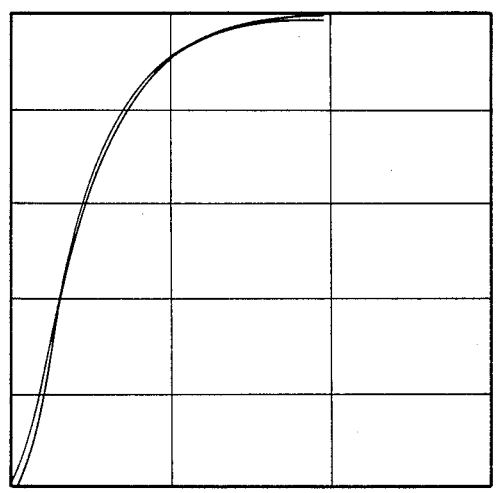
FIGS. 7 and 8 are graphs depicting predicted and observed Pcum for noise only and noisy speech cases.
Figure 8:
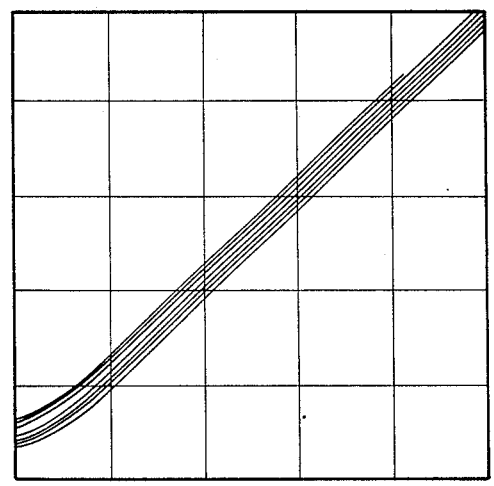

FIG. 7 shows an example of how well the noise-only case fits observation. Shown is the actual cumulative distribution for Gaussian white noise through the first channel and the predicted distribution, $P(X|S=0)$. The first channel has an independent equivalent count, $\chi$, of 1.81. The sample size is 1103 frames was used to generate the distribution. FIG. 8 shows an example of how well the noisy speech case fits the predicted distribution, $P(X|S)$. Shown are the fractiles for the distribution superimposed on a scatter plot of WIJA's clean versus noise channel parameters taken from the 25th channel.

Distribution Using Normalized Parameters

We have been using quantities with the dimension of magnitude (versus power) and normalizing by the rms magnitude of noise. What is actually required is the distribution of the non-dimensional quantities $$\xi = \sqrt{\frac{X}{P_n}} \text{ and } \eta = \sqrt{\frac{S}{P_n}}$$

Since $$P(\xi|\eta)d\xi = P(X|S)dX.$$

$$P(\xi|\eta) = 2\sqrt{P_N}\sqrt{X} P(X|S).$$
$$= 2\chi\xi\left(\frac{\xi}{\eta}\right)^{X-1} e^{-\chi(\xi^s+\eta^s)}I_{X-1}(2\chi\xi\eta)$$

$$P(\xi|\eta) = 2\chi\xi\left(\frac{\xi}{\eta}\right)^{X-1} e^{-\chi(\xi^s+\eta^s)}I_{X-1}(2\chi\xi\eta)$$

and $$P(\xi|\eta=0) = \frac{2\xi\chi}{\Gamma(\chi)}(\chi\xi^2)^{X-1}e^{-\chi\xi^s}$$

or $$P(\xi|\eta=0) = \frac{2\chi^\chi}{\Gamma(\chi)}\xi^{2\chi-1}e^{-\chi\xi^s}$$

As one check of these results, we see that they reduce to the previous case of individual DFT channels when $\chi=1$. In that case, these distributions are $$P_1(\xi|\eta) = 2\xi e^{-(\xi^s+\eta^s)}I_0(2\xi\eta)$$

and $$P_1(\xi|\eta=0) = 2\xi e^{-\xi^s}$$

The first formula is used to find optimal DFT channel estimators and the second is a normalized Rayleigh distribution.

For scaling purposes we have found it convenient to use a different transformation for the Bessel function calculation. We use $$i_\nu(x) = e^{-x} I_\nu(x)$$

Then $$P(\xi|\eta) = 2\chi\xi \left(\frac{\xi}{\eta}\right)^{x-1} e^{-\chi(\xi-\eta)g} i_{\chi-1}(2\chi\xi\eta)$$

and again for reference, $$P(\xi|\eta = 0) = \frac{2\chi^\chi}{\Gamma(\chi)} \xi^{2\chi-1} e^{-\chi\xi g}$$

APPENDIX V

UNNORMALIZED NOISE METRIC STUDIES

Introduction

This section presents an analysis of the noise immune distance metric without normalization. Parameters consist of the fourth root of filterbank output power. To demonstrate that the metric has been calculated properly, scatter plots of clean distances versus noise parameters superimposed with the noise metric are presented. Also in order to verify the installation of the variance tables and new metric code, wordspotting runs using unnormalized parameters were made. As expected, use of these parameters reduce overall performance by 10% to 20%. However, the intent of these experiments was to verify the code and correlate a reduction in rms error to increased wordspotting performance. The results demonstrate that the combination of optimal parameters plus variance terms improves performance to the same level as using clean speech for five of the six template talkers.

Minimum Error Estimate

The noise metric is based upon the premise that adding noise to the unknown or template generates noisy distances. Noise immunity is obtained by replacing the Euclidean squared distance between the template and unknown frames by its conditional expectation of the squared distance without noise, given the noisy observations. That is, $$\hat{d}^2 = E[(t_s - u_s)^2 | t_{s+n}, u_{s+n}, P_s, P_n]$$

where
$t_s$ = 4th root of power for template
$u_s$ = 4th root of power for unknown
$t_{s+n}$ = noisy template filterbank parameter
$u_{s+n}$ = noisy unknown filterbank parameter
$P_s$ = Average Power of Speech
$P_n$ = Average Power of Noise.

The conditional expected value is the minimum mean squared error estimate of the distance, given the observations. It will reduce the noise on the frame-to-frame distance values to its minimum possible value for the given data. It is also an unbiased estimate.

Expanding the expected value and replacing mean values by their optimal estimates gives:

$$\hat{d}^2 = \Sigma(\hat{t}_i - \hat{u}_i)^2 + \sigma t^2_i + \sigma u^2_i$$

The quantities $\hat{t}_i$ and $\hat{u}_i$ are the expected values of the template and unknown for each channel and $\sigma_{ti}$ and $\sigma_{ui}$ are the variances of these estimates for each channel. Notice that this metric model reduces to a standard Euclidean norm in the absence of noise. The metric model is also symmetric and can be applied when either the template or unknown or both are noisy.

Values for these means and variances are obtained by table lookup. These tables are generated using filterbank parameters as previously described.

To establish that the metric was working properly two types of experiments were conducted: First scatter plots of clean distances versus noisy filterbank parameters were generated and superimposed with the euclidean metrics using noisy and optimal parameters and with the optimal parameters plus the variance terms. Second, wordspotting runs with these parameters and metrics were made.

Verification of Expected Value

In the same manner as used in Appendix III the validity of the noise metric as a conditional expected value can be examined by plotting clean distances versus noisy parameters. The distance requires a noisy unknown frame and a clean or noisy template frame. In order to plot in just two dimensions, the template frame was held constant and a set of distances were generated for various unknown conditions and metrics. Three template frames, 0, 10, and 50 were selected from the Boonsburo template of speaker 50 representing the minimum, average and maximum spectral values. Distances and spectral outputs from the ninth filter were selected as approximately representing to the average signal to noise ratio over the entire baseband. FIGS. 9 through 11 show the scatter data along with the noisy distance, (straight parabola), euclidean distance with optimal parameters, and the noisy metric. For this single channel, single template frame configuration, there is little difference between using just the optimal parameters and the parameters plus the variance term. However in each case the noisy metric passes through the mean of the clean distances given the noisy unknown parameter. The dark band in each figure corresponds to distances where the clean speech was near zero, resulting in a distance equal to the square of the template parameter. Since the optimal parameter tables where trained on speech only frames, the mean distance is not biased by this non-speech concentration. Note that for large values of the noise parameter, that all three distances agree. This is to be expected, since the mean has approached the identity and the variance has approached zero (See FIGS. 10 and 11).

Reduction in Mean Square Error

The mean square error for each of these cases was also computed. The error was claculated as:

$$\text{error} = \Sigma(\text{distance}_{processed} - \text{distance}_{clean})^2$$

As expected the error reduced monotonically going from noisy to the optimal parameters, to the noise metric. Below is the computed mean square error between clean distance and the distances computed with each of following parameters: noisy, optimal estimator and optimal estimator plus variance, i.e., noise metric. The distance is straight Euclidean, i.e. the sum of the squares between the unknown spectral values minus the template spectral values. These distances for the mean square error calculation, were computed by selecting the 10th frame from the Boonsburo template for speaker 50 and dragging it by 1100 speech frames from the first section of WIJA. The average mean square error values are:

| Condition | mse |
| --- | --- |
| noisy - clean | 9.4 |
| optimal parameters - clean | 3.3 |
| noise metric - clean | 2.5 |

Although this represents only a course examination of performance, it does demonstrate that the metric is performing as desired. A more realistic test requires examining its performance in a wordspotting experiment as defined below.

Wordspotting Using Unnormalized Parameters

The wordspotter was modified to use unnormalized 4th root parameters and Euclidean distance with or without the variance terms added. All other aspects of the wordspotting program remained the same, i.e. standard blind deconvolution, overlap removal, biasing, etc. FIGS. 12 through 17 show the ROC curves for each template talker.

Observations

Although overall performance using unnormalized parameters is lower than using normalized features, these experiments show some interesting characteristics. Specifically, for five of the six template talkers, use of the optimal parameters and/or the noise metric returned performance to levels equal to the clean unknown data. This degree of restoration is not found in the normalized case. Stated another way, normalization tends to minimize the deleterious effect of noise and the restoring effect of the optimal parameters.

We claim:

1. A method of compensating for noisy input speech in order to improve the recognition result of a speech recognition apparatus having an input for unknown speech, converting means for converting the unknown speech into time-sampled frames of speech signals representing its spectral distribution over a given range of frequencies, storing means for storing templates of known speech in the form of speech signals representing its spectral distribution over the given range of frequencies, computing means for computing the minimum mean square error of the Euclidean squared distance between the speech signals of the unknown speech compared with the speech signals of the template speech, and recognizer means for producing a recognition result based upon the minimum mean square error computed by the computing means, wherein said method of compensating for noisy input speech comprises the following steps for producing an improved minimum mean square error estimate conditioned by compensatory characteristics of the noisy input speech:

(a) computing optimal estimated distance values over the given range of frequencies for noise-free template speech, based upon comparing known speech segments, which are input in a noise-free environment and converted into corresponding templates of known speech signals $t_s$, with unknown speech segments, which are input in a noise-free environment and converted to unknown speech signals $u_s$;

(b) computing estimated variance values corresponding to the optimal estimated distance values for a sample population of noise-free speech segments;

(c) storing said optimal estimated distance values and variance values on a look-up table associated with the template speech;

(d) computing squared distance values over the given range of frequencies for input noisy unknown speech signals $u_{s+n}$ compared with signals $t_{s+n}$ representing template speech to which a spectral representation of noise n in the actual input environment is added;

(e) replacing the computed squared distance values for the unknown speech signals with conditional expected distance values calculated using the optimal estimated distance values and variance values obtained from the look-up table, in order to derive noise-immune metric values for the unknown speech signals; and (f) computing the minimum mean square error of the noise-immune metric values for the unknown speech signals compared with the noise-free template speech signals, whereby an improved recognition result is obtained.

2. The method according to claim 1, wherein said values are provided at specific frequencies within the speech band.

3. The method according to claim 2, wherein said frequencies employed are at 300, 425, 1063, 2129 and 3230 Hz.

4. The method according to claim 3, wherein said values are provided at selected average signal-to-noise ratios.

5. The method according to claim 4, wherein said average signal-to-noise ratios are 0 db, 10 db, and 20 db.

6. The method according to claim 2, wherein said values stored are indicative of said first value at different frequencies within said speech bandwidth.

7. The method according to claim 4, wherein said values stored are indicative of said first value at different signal-to-noise ratios.

8. The method according to claim 1, wherein said values are replaced by mean values to provide a new expected distance equal to:

$$\hat{d}^2 = (\hat{t} - \hat{u})^2 + \sigma_t^2 + \sigma_u^2$$

where $\hat{t}$ & $\hat{u}$ are the expected values of the template and unknown and $\sigma_t$ & $\sigma_u$ are the variances of the estimates.

* * * * *